United States Patent
Weitzhandler et al.

(10) Patent No.: US 7,907,058 B2
(45) Date of Patent: Mar. 15, 2011

(54) DEVICES AND METHODS USEFUL FOR AUTHORIZING PURCHASES ASSOCIATED WITH A VEHICLE

(75) Inventors: Shimon Weitzhandler, RaAnana (IL); Yoav Vilnai, Tel-Aviv (IL); Ilay Levie, Tel-Aviv (IL); Avi Yalon, Ramat-Gan (IL)

(73) Assignee: Petratec International Ltd., Kfar-Saba (IL)

( * ) Notice: Subject to any disclaimer, the term of this patent is extended or adjusted under 35 U.S.C. 154(b) by 331 days.

(21) Appl. No.: 12/083,979

(22) PCT Filed: Oct. 24, 2006

(86) PCT No.: PCT/IL2006/001222
§ 371 (c)(1),
(2), (4) Date: Apr. 23, 2008

(87) PCT Pub. No.: WO2007/049274
PCT Pub. Date: May 3, 2007

(65) Prior Publication Data
US 2009/0045978 A1    Feb. 19, 2009

Related U.S. Application Data

(60) Provisional application No. 60/729,215, filed on Oct. 24, 2005, provisional application No. 60/762,498, filed on Jan. 27, 2006, provisional application No. 60/790,533, filed on Apr. 10, 2006.

(51) Int. Cl.
*G08B 13/14* (2006.01)

(52) U.S. Cl. .................. 340/572.8; 340/572.9

(58) Field of Classification Search .............. 340/572.1, 340/572.4, 572.7, 572.8, 572.9, 568.1, 568.2, 340/568.4, 539.11; 141/94, 98, 68; 700/282; 235/375, 380
See application file for complete search history.

(56) References Cited

U.S. PATENT DOCUMENTS

| | | | |
|---|---|---|---|
| 4,469,149 A | * | 9/1984 | Walkey et al. ............ 141/94 |
| 5,184,309 A | | 2/1993 | Simpson et al. |
| 5,605,182 A | | 2/1997 | Oberrecht et al. |
| 5,727,608 A | | 3/1998 | Nusbaumer et al. |
| 5,742,229 A | | 4/1998 | Smith |
| 5,858,501 A | | 1/1999 | Malone |
| 5,887,367 A | | 3/1999 | Alvern |
| 5,906,228 A | | 5/1999 | Keller |
| 5,913,180 A | | 6/1999 | Ryan |
| 5,923,572 A | | 7/1999 | Pollock |
| 5,944,069 A | | 8/1999 | Nusbaumer et al. |

(Continued)

FOREIGN PATENT DOCUMENTS

DE    10241323    5/2004

(Continued)

OTHER PUBLICATIONS

International Search Report Dated Oct. 6, 2008 From the International Searching Authority Re.: Application No. PCT/IL2008/000349.

(Continued)

*Primary Examiner* — Van T. Trieu

(57) ABSTRACT

Various devices are useful as components of a system for authorizing purchases associated with a vehicle that are generally simple to install, operate and maintain and are generally resistant to abuse. The devices include theft-resistant vehicular identification tags, sealed identification tag reader and variable range tag-readers.

18 Claims, 13 Drawing Sheets

U.S. PATENT DOCUMENTS

| | | | |
|---|---|---|---|
| 6,024,142 A | 2/2000 | Bates | |
| 6,085,805 A * | 7/2000 | Bates .............................. | 141/94 |
| 6,089,284 A | 7/2000 | Kaehler et al. | |
| 6,232,877 B1 | 5/2001 | Ashwin | |
| 6,313,737 B1 | 11/2001 | Freeze et al. | |
| 6,338,008 B1 | 1/2002 | Kohut et al. | |
| 6,343,241 B1 | 1/2002 | Kohut et al. | |
| 6,374,870 B1 | 4/2002 | Müller | |
| 6,411,824 B1 | 6/2002 | Eidson | |
| 6,648,032 B1 | 11/2003 | Kelrich et al. | |
| 6,899,151 B1 | 5/2005 | Latka et al. | |
| 7,034,683 B2 * | 4/2006 | Ghazarian .................. | 340/568.1 |
| 7,042,357 B2 * | 5/2006 | Girvin et al. ............... | 340/568.2 |
| 7,119,690 B2 * | 10/2006 | Lerch et al. ............... | 340/568.2 |
| 2003/0146876 A1 | 8/2003 | Greer et al. | |
| 2004/0079799 A1 | 4/2004 | Symonds et al. | |
| 2004/0156339 A1 | 8/2004 | Urquhart et al. | |
| 2004/0203360 A1 | 10/2004 | Yamagiwa | |
| 2004/0221920 A1 | 11/2004 | Ferguson et al. | |
| 2006/0012479 A1 | 1/2006 | Ezra | |
| 2006/0145926 A1 | 7/2006 | Choi et al. | |
| 2009/0289113 A1 | 11/2009 | Vilnai et al. | |

FOREIGN PATENT DOCUMENTS

| | | |
|---|---|---|
| EP | 0349316 | 1/1992 |
| EP | 0642232 | 3/1995 |
| EP | 0805566 | 11/1997 |
| EP | 0943584 | 9/1999 |
| EP | 1099664 | 5/2001 |
| EP | 1115176 | 7/2001 |
| EP | 0729426 | 4/2003 |
| EP | 00906598 | 3/2005 |
| GB | 2400364 | 10/2004 |
| WO | WO 01/03983 | 1/2001 |
| WO | WO 02/087969 | 11/2002 |
| WO | WO 2005/021419 | 3/2005 |
| WO | WO 2005/124581 | 12/2005 |
| WO | WO 2006/044168 | 4/2006 |
| WO | WO 2006/124270 | 11/2006 |
| WO | WO 2007/003293 | 1/2007 |
| WO | WO 2007/049273 | 5/2007 |
| WO | WO 2008/090539 | 7/2008 |
| WO | WO 2008/096361 | 8/2008 |
| WO | WO 2008/111075 | 9/2008 |
| WO | WO 2009/050662 | 4/2009 |

OTHER PUBLICATIONS

International Search Report Dated Nov. 10, 2008 From the International Searching Authority Re.: Application No. PCT/IL06/01221.
Written Opinion Dated Oct. 6, 2008 From the International Searching Authority Re.: Application No. PCT/IL2008/000349.
Written Opinion Dated Nov. 10, 2008 From the International Searching Authority Re.: Application No. PCT/IL06/01221.
Communication Relating to the Results of the Partial International Search Dated Oct. 20, 2008 From the International Searching Authority Re.: Application No. PCT/IL2008/000349.
International Preliminary Report on Patentability Dated Dec. 11, 2008 From the International Bureau of WIPO Re.: Application No. PCT/IL2006/001222.
International Preliminary Report on Patentability Dated Jan. 22, 2009 From the International Bureau of WIPO Re.: Application No. PCT/IL2006/001221.
International Preliminary Report on Patentability Dated Aug. 6, 2009 From the International Bureau of WIPO Re.: Application No. PCT/IL2007/001575.
International Search Report Dated Mar. 4, 2009 From the International Searching Authority Re.: Application No. PCT/IB2008/054248.
Written Opinion Dated Mar. 4, 2009 From the International Searching Authority Re.: Application No. PCT/IB2008/054248.
International Preliminary Report on Patentability Dated Sep. 24, 2009 From the International Bureau of WIPO Re.: Application No. PCT/IL2008/000349.
Official Action Dated Jan. 5, 2010 From the US Patent and Trademark Office Re.: U.S. Appl. No. 12/083,968.
International Search Report Dated Sep. 4, 2008 From the International Searching Authority Re.: Application No. PCT/IL2008/000168.
Written Opinion Dated Sep. 4, 2008 From the International Searching Authority Re.: Application No. PCT/IL2008/000168.
International Search Report Dated Mar. 20, 2008 From the International Searching Authority Re.: Application No. PCT/IL06/01222.
Written Opinion Dated Mar. 20, 2008 From the International Searching Authority Re.: Application No. PCT/IL06/01222.
Partial International Search Report Dated Jul. 10, 2008 From the International Searching Authority Re.: PCT/IL2008/000349.
International Search Report Dated Jul. 10, 2008 From the International Searching Authority Re.: Application No. PCT/IL2007/001575.
Written Opinion Dated Jul. 10, 2008 From the International Searching Authority Re.: Application No. PCT/IL2007/001575.
International Preliminary Report on Patentability Dated Apr. 29, 2010 From the International Bureau of WIPO Re.: Application No. PCT/IB2008/054248.
Response Dated Jul. 6, 2010 to Official Action of Jan. 5, 2010 From the US Patent and Trademark Office Re.: U.S. Appl. No. 12/083,968.
Communication Pursuant to Article 94(3) EPC Dated Sep. 22, 2010 From the European Patent Office Re. Application No. 08840101.3.
Official Action dated Sep. 14, 2010 From the US Patent Patent and Trademark Office Re.: U.S. Appl. No. 12/083,968.

* cited by examiner

DEVICES AND METHODS USEFUL FOR AUTHORIZING PURCHASES ASSOCIATED WITH A VEHICLE

RELATED APPLICATIONS

This application is a National Phase Application of PCT Application No. PCT/IL2006/001222 having International Filing Date of Oct. 24, 2006, which claims the benefit of U.S. Provisional Patent Application No. 60/729,215, filed on Oct. 24, 2005, U.S. Provisional Patent Application No. 60/762, 498, filed on Jan. 27, 2006, and U.S. Provisional Patent Application No. 60/790,533, filed on Apr. 10, 2006. The contents of the above Applications are all incorporated herein by reference.

FIELD AND BACKGROUND OF THE INVENTION

The present invention relates to the field of purchase authorization and, more particularly, to methods and devices useful for implementing methods of purchase authorization associated with a vehicle.

The present invention gains priority from U.S. Provisional Patent Application No. 60/762,498, filed on Jan. 27, 2006, and U.S. Provisional Patent Application No. 60/729,215, filed on Oct. 24, 2005, which are incorporated in by reference as if fully set forth herein.

In the past a gas station was primarily a location to purchase fuel for a vehicle and occasionally to purchase comestibles and products associated with vehicular operation. Increasingly, gas stations are transforming into service stations, becoming one of the most important retail venues in industrialized society. The reasons for the increasing importance of service stations as retail venues as well as the nature of the purchases result from the relative advantages of service stations which are dictated by the primary purpose of service stations: efficiently providing fuel to vehicles.

To be successful as a gas station, a service station must generally be located on a heavily traveled road, cover a large area allowing high speed entrance and egress, many fuel-dispensing locations arranged for high-throughput refueling of many continuously arriving vehicles and must have an efficient method for paying for the fuel. Increasingly, people are found traveling on the road for extended periods of time, and consequently have less time to purchase items at local stores and even to make a special trip for the purpose of shopping, especially as shopping trips often include time wasted in search of parking and walking to and from the vehicle. People have less opportunity to become acquainted with local stores so little loyalty develops to a local store and may not even know where such a store is located. At the same time, the actual refueling process requires a relatively long time, time which must be utilized.

As a result of the above factors, persons refueling at a service station find themselves with a car safely parked at a fuel-dispensing location waiting while the fuel is dispensed during which purchases of various and sundry goods may be performed. Given the above situation, a service station operator finds it desirable to increase the attractiveness of an own service station relative to other service stations, to increase revenues from non-fuel purchases performed at the service station and to engender customer loyalty.

Due to the development of sophisticated control electronics and vehicle identification devices, gasoline service stations have evolved into complex electronic systems having point-of-sale (POS) devices able to accommodate various types of payment means. One preferred method for increasing the attractiveness of a service station is through the use of automated payment for fuel. A vehicle is equipped with an identification tag storing data relating to the vehicle identity. A tag-reader is associated with each individual fuel-dispensing location, for example with the fuel-dispensing nozzle, of the service station. When the fuel-dispensing nozzle is placed inside the refueling port of the vehicle, a tag-reader reads data from the identification tag and transmits the data to a central location that issues an authorization signal to dispense fuel if the payment method is valid. Not only are such methods efficient allowing fuel dispensing and payment to occur virtually automatically, but also such methods reduce the chance of fuel-theft and gas-station robbery.

The advent of advanced service station systems has produced a need for increased transaction efficiency, a need met, for example, by the development of fully automated authorization and purchasing systems. In fully automated authorization and purchasing systems, the purchase of goods or services at service stations does not require the use of a credit card, debit card, or smart card. Rather, a customer or vehicle is provided with a communications device such as, for example, identification tag, which stores data associated with the customer or vehicle such as, for example, credit account details. The communications device is configured to communicate with other components of the service station systems such as, for example, fuel dispensers and cash registers. In this manner, the identification device automatically transmits data associated with the customer or vehicle and the system automatically carries out the financial aspects of the transaction such as payment for the purchase of goods or services, without requiring any specific action by the customer or by the service station employee.

In the art, various methods, systems, and devices for automatic refueling of vehicles are known. These include wireless RF servers which communicate with devices located within fuel dispensers and with identification devices mounted on vehicles, such as disclosed in U.S. patent application Ser. No. 09/911,570 published as US 2003/0025600, and systems for the management of fueling transactions, such as that of U.S. patent application Ser. No. 10/425,073 published as US 2004/0215575. There are also known systems for ensuring the positioning of a vehicle relative to a fixed automatic fueling service terminal, such as that disclosed in U.S. patent application Ser. No. 10/298,160 published as US 2004/0095230.

U.S. patent application Ser. No. 11/042,196 published as US 2005/0184155 relates to a vehicle fueling system wherein the vehicle is provided with an RF identification tag sticker mounted on the vehicle windshield and wherein the fueling station includes sensors for detecting the presence of the vehicle and reporting to a controller subsystem. The controller subsystem communicates with a point of sale system for processing a fueling transaction and activation of a fuel dispenser. A feature of the teachings of U.S. patent application Ser. No. 11/042,196 is that there is no need for a tag reader on each fuel dispenser.

U.S. Pat. No. 5,857,501 discloses a system for fueling a vehicle which includes an identification unit having a communication loop and circuitry for transmitting information associated with the vehicle, such as identification number, credit account information, and fuel requirements. The unit is mounted on the fuel intake pipe of the vehicle and communicates with a data receiver located proximal to the fuel dispensing station. In order to secure the unit to the fuel intake pipe of the vehicle, the device requires a housing assembly having a series of tabs and a ratchet type assembly, and a tool is used to advance the ratchet assembly such that the housing assembly is tightened against the interior of the fuel intake pipe. An alternative embodiment of the invention requires a housing assembly having a series of compression activated expansion joints which are expanded by the tightening of screws such that the housing assembly is tightened against the interior of the fuel intake pipe.

U.S. Pat. No. 6,648,032 relates to a fuel distribution system wherein there is provided a nozzle-mounted device which receives information, such as vehicle identification and fueling data, from a vehicle-mounted transceiver prior to discharge of fuel into the vehicle. The device communicates with an authorization subsystem located at the fuel filling facility. The vehicle-mounted transceiver is located on an inner surface of the vehicle chassis and includes an antenna for transmitting information to the nozzle-mounted device. The device also includes a fuel flow driven transceiver power generator operated by fuel pumped by the fuel pump that passes through the fuel nozzle.

U.S. Pat. No. 6,900,719 discloses an anti-theft device that provides protection for an identification device utilized in a vehicle refueling system. The anti-theft device comprises a plug that retains an electrical chip having a unique identification number for the vehicle, the plug being inserted into a bore in the body of the vehicle. The chip must be programmed and the plug must be installed on the vehicle body by the vehicle manufacturer. The chip is electrically connected to a controller portion of the system by an electrical connection installed at the fuel inlet of the vehicle. Removal of the identification device from the body of the vehicle will disable the controller portion of the system, such that the device provides anti-theft protection for the vehicle identification chip.

In unpublished copending U.S. Patent Application No. 60/762,498 of the applicant is disclosed a system for authorizing purchases associated with vehicles. In disclosed embodiments, a vehicle is provided with both a passive identification tag (e.g., an RFID tag) in proximity of the refueling port of the vehicle and an active identification tag that records data associated with vehicular operation. A service station controller confirms that the active identification tag and the RFID tag are associated with the same vehicle and then provides refueling authorization to a fuel-dispensing pump. During refueling the active identification tag transmits the recorded vehicle operation data. Disclosed is also a method of authorizing a purchase associated with a vehicle by providing a vehicle both an active identification tag and a passive identification tag. When a purchase authorization is requested both the active identification tag and the passive identification tag are interrogated. If the identification tags match, the purchase is authorized. In embodiments, the active identification tag also acts as a meter device, recording data associated with vehicle use including driving behavior.

Known devices used as components of systems for authorizing purchases associated with vehicles as service stations are plagued by high installation and maintenance costs and susceptibility to abuse. It is highly desirable to have devices that are components of purchase authorizing systems that are easily and quickly installed to existing vehicles and service stations. It is highly desirable to have devices that are components of purchase authorizing systems that are resistant to abuse, e.g. stolen or misused, to allow theft of gasoline and the like.

SUMMARY OF THE INVENTION

The present invention is of methods and devices, embodiments of which address at least some of the shortcomings of the prior art in the field of authorizing purchases associated with vehicles. Embodiments of the present invention are devices that are abuse resistant and/or simple to install or retrofit in existing service stations.

A first aspect of the present invention is of a vehicle identification tag reader that, in embodiments, is simple to install or retrofit and exceptionally safe and durable by sealing components within a casing.

Thus according to the teachings of the present invention there is provided a vehicle identification tag reader, comprising: a) a casing configured for attachment to a fuel-dispensing nozzle; b) an identification tag reading transceiver sealed within the casing; and c) a power storage unit (e.g., a battery), in embodiments rechargeable, for supplying energy to the transceiver, preferably but not necessarily also sealed within the casing. In embodiments, the transceiver is embedded within the casing. In embodiments, the transceiver is enclosed within a sealed chamber inside the casing. In embodiments the casing is monolithic. In embodiments, the chamber is seamless.

A second aspect of the present invention is of a vehicle identification tag reader that, in embodiments, is exceptionally safe by including a photovoltaic cell to provide power for the associated tag reading transceiver.

Thus, according to the teachings of the present invention there is also provided a vehicle identification tag reader, comprising: a) a casing configured for attachment to a fuel-dispensing nozzle; b) an identification tag reading transceiver associated with the casing; c) a rechargeable power storage unit for supplying energy to the transceiver; and d) a photovoltaic cell to convert light to electrical energy to recharge the power storage unit. In embodiments, the photovoltaic cell is sealed within the casing. In embodiments, the photovoltaic cell is held within the casing and at least part of the casing is substantially transparent so as to allow light to pass through the transparent part and interact with the photovoltaic cell.

A third aspect of the present invention is of a vehicle identification tag reader that, in embodiments, is exceptionally safe by including a fuel-dispensing nozzle trigger powered electricity generator to provide power for the associated tag reading transceiver.

Thus, according to the teachings of the present invention there is also provided a vehicle identification tag reader, comprising: a) a casing configured for attachment to a fuel-dispensing nozzle; b) an identification tag reading transceiver associated with the casing; c) a rechargeable power storage unit for supplying energy to the transceiver; and d) a generator to convert mechanical energy from actuation of a trigger of the fuel-dispensing nozzle into electrical energy to recharge the power storage unit.

A fourth aspect of the present invention is of a vehicle identification tag reader that, in embodiments, is exceptionally safe by including an electricity generator that converts motion of the fuel-dispensing nozzle, e.g. shaking, jostling and the like, to provide power for the associated tag reading transceiver.

Thus, according to the teachings of the present invention there is also provided a vehicle identification tag reader, comprising: a) a casing configured for attachment to a fuel-dispensing nozzle; b) an identification tag reading transceiver associated with the casing; c) a rechargeable power storage unit for supplying energy to the transceiver; and d) a generator to convert mechanical energy from movement of the tag-reader into electrical energy to recharge the power storage unit.

A fifth aspect of the present invention is of a vehicle identification tag reader that, in embodiments, is exceptionally safe by including a recharging component for a power storage unit that works by induction.

Thus, according to the teachings of the present invention there is also provided a vehicle identification tag reader, comprising: a) a casing configured for attachment to a fuel-dispensing nozzle; b) an identification tag reading transceiver associated with the casing; c) a rechargeable power storage unit for supplying energy to the transceiver; and d) a recharging component configured to provide electrical energy to recharge the power storage unit by induction.

In embodiments, a tag reader of the present invention further comprises a station communication transceiver configured for two-way communication with a service station controller. In embodiments, the identification tag reading transceiver is configured for two-way communication with a service station controller. In embodiments, the tag reader is provided with a separate station communication transceiver. In embodiments, the station communication transceiver has at least three modes: i) an active mode, wherein the station communication transceiver is operative to transmit signals and to receive transmissions from the service station controller; ii) a rest mode, wherein the station communication transceiver is operative to receive transmissions from the service station controller; and iii) a sleep mode, wherein the station communication transceiver substantially reduces energy usage. In embodiments, the station communication transceiver is configured to enter the sleep mode after a predetermined period of inactivity and to periodically enter the rest mode from the sleep mode. In embodiments, the station communication transceiver enters the active mode from the rest mode upon receipt of a transmission from a service station controller.

In embodiments of a tag reader of the present invention, the identification tag reading transceiver has at least two modes: iv) an active mode, wherein the identification tag reading transceiver is operative to transmit signals and to receive return transmissions from an identification tag; and v) a sleep mode, wherein the identification tag reading transceiver substantially reduces energy usage. In embodiments of the present invention, the identification tag reading transceiver enters the sleep mode after a predetermined period of inactivity. In embodiments, of the present invention, a tag reader of the present invention comprises a use detector, configured to detect that a fuel-dispensing nozzle to which the tag reader is attached is to be used and subsequently sets the identification tag reading transceiver to the active state. In embodiments, the use detector is a movement detector, configured to detect movement of a fuel-dispensing nozzle to which the tag reader is attached. In embodiments, the station communication transceiver is configured to set the identification tag reading transceiver to the active mode upon receipt of instructions from the service station controller.

In embodiments of a tag reader of the present invention, the configuration for attachment to a fuel-dispensing nozzle is reversible, allowing simple replacement, for example in case of technical difficulties, hardware upgrading or when a power storage unit is no longer effective. In embodiments of a tag reader of the present invention, the configuration for attachment to a fuel-dispensing nozzle comprises a clamping unit having at least two clamping components moveable relative one to the other. In embodiments, the clamping unit is configured to clamp about the fuel-dispensing pipe of the fuel-dispensing nozzle. In embodiments of a tag reader of the present invention, the configuration for attachment to a fuel-dispensing nozzle comprises a constricting band, configured to close about the fuel-dispensing pipe of the fuel-dispensing nozzle.

A sixth aspect of the present invention is of a method and of a vehicle identification tag reader that, in embodiments, are configured to be resistant to fuel theft by use of a variable range identification tag reader.

Thus according to the teachings of the present invention there is also provided a method of reducing fuel-theft, comprising a) placing a fuel-dispensing nozzle provided with a vehicle identification tag reader including a variable transmission power transceiver in proximity of a refueling port of a vehicle provided with a passive vehicle identification tag; b) determining the identity of a vehicle with which the passive vehicle identification tag is associated; c) transmitting a signal to the passive vehicle identification tag from the vehicle identification tag reader with a power level determined at least in part on the identity of the vehicle with which the passive vehicle identification tag is associated.

In embodiments of the present invention, determining the identity of a vehicle with which the passive vehicle identification tag is associated includes receipt of a power-determining signal by the vehicle identification tag reader, in embodiments from an active identification tag associated with the passive vehicle identification tag, in embodiments from a service station controller, and in embodiments from the passive identification tag. In embodiments of the latter case, the vehicle identification tag reader transmits an exploratory signal having a sufficient power to read substantially any associated passive vehicle identification tag and in response the passive vehicle identification tag transmits the power-determining signal.

In embodiments, the power-determining signal comprises the required power level. In embodiments, the power-determining signal comprises a passive vehicle identification tag identity. In embodiments, the power-determining signal comprises a vehicle model.

According to the teachings of the present invention there is also provided a vehicle identification tag reader, comprising: a) an identification tag reading transceiver functionally associated with a fuel-dispensing nozzle of a fuel-dispenser; and b) a transmission power controller configured to change the power level of transmission of the tag reading transceiver. In embodiments, the tag reader comprises a logic circuit configured to determine a desired power level based on a vehicle identity: the tag reader receives a vehicle identity and determines what power level is required to reduce the chance of fuel theft in accordance with the teachings of the present invention. In embodiments, a tag reader further comprises a station communication transceiver configured to receive a signal from a service station controller relating to a desired power level. In embodiments, the identification tag reading transceiver is configured for two-way communication with a service station controller. In embodiments, the tag reader is provided with a separate station communication transceiver.

A seventh aspect of the present invention is of a vehicle identification tag that is abuse resistant and simple to install on vehicles. Specifically, the tag is configured for attachment to a vehicle using a constricting band placed around a fuel inlet pipe of a vehicle. Through the band are placed conductors such as wires that are part of an identification circuit. When the band is cut, for instance to steal the vehicle identification tag, the conductors are also cut, disabling or otherwise rendering the circuit effectively inoperable.

Thus according to the teachings of the present invention there is also provided a vehicle identification tag, comprising a) a constricting band having a looped configuration; b) a vehicle identification circuit (in embodiments a passive identification circuit, such as a RFID circuit) attached to the constricting band; and c) at least one electrical conductor embedded in the band as a component of an anti-tamper circuit of the vehicle identification circuit wherein when the constricting band is in the looped configuration the at least one electrical conductor is closed and closes a part of the anti-tamper circuit and when the band is in a non-looped configuration the part of the anti-tamper circuit is broken whereby the identification circuit is rendered substantially inoperable. In embodiments, in the band are embedded at least two mutually insulated electrical conductors, each as a component of the anti-tamper circuit. In embodiments, the electrical conductors are intertwined. In embodiments, in the band is embedded at least one dummy electrical conductor that when broken does not have a substantial effect on operation of the vehicle identification circuit. In embodiments, the at least one dummy conductor is intertwined with the at least one electrical conductor.

In embodiments, the constricting band is a non-releasable constricting band, analogous to a plastic tie known to one skilled in the art of packing. In embodiments, the constricting band has at least two configurations: i) a linear (open) configuration having a first end and an opposing end, where the at least one electrical conductor is open; and ii) the looped configuration, where the at least one electrical conductor is closed, wherein the band is configured to be looped into the looped configuration from the linear configuration.

In embodiments, in a region in proximity of the first end and the opposing end are provided electrical contacts apparent on a surface of the constricting band, each electrical contact in contact with an electrical conductor from amongst the at least one electrical conductors so that when a electrical contact in proximity of the first end is contacted with a electrical contact in proximity of the opposing end, a electrical conductor is closed, closing a corresponding circuit.

In embodiments, looping the constricting band into the looped configuration includes coupling the first end to the opposing end. In embodiments, the first end is provided with locking features and the opposing end is provided with a locking head configured to receive the first end and to engage the locking features so as to prevent withdrawal of the first end from the locking head whereby the first end is coupled to the opposing end and the band is looped.

In embodiments, the constriction band further comprises at least one band coupler to increase the size of the loop of a constricting band, each band coupler having two ends, a first end configured to couple proximal to the first end of the band and a second end configured to couple proximal to the opposing end of the band.

An eighth aspect of the present invention is of a vehicle identification tag that is abuse resistant and simple to install on vehicles. Specifically, the tag is configured for attachment to a vehicle with adhesive that provides an adhesion stronger than the structural strength of at least part of the vehicle identification tag. When an attempt is made to steal the vehicle identification tag by breaking the adhesion, the tag breaks, disabling or otherwise rendering the vehicle identification circuit inoperable.

Thus, according to the teachings of the present invention is provided a method of reducing theft of a vehicle identification tag from a vehicle, comprising: a) providing a vehicle identification tag including a casing, the casing having at least one weak point having a structural strength; b) a vehicle identification circuit associated with the casing configured to break if the casing is broken at a weak point; c) securing the vehicle identification tag to a vehicle using a first adhesive to form a first adhesion wherein the first adhesion has an adhesive strength greater than the structural strength of a weak point. In embodiments, a portion of the vehicle identification circuit passes through a weak point. In embodiments, the casing includes a first casing part configured to mate with a second casing part forming a seam and the method further comprises securing the first part to the second part using a second adhesive to form a second adhesion wherein the first adhesion has a greater adhesive strength than the second adhesion so that second adhesion constitutes a weak point. In embodiments, mating of the first part and the second part closes the vehicle identification circuit.

Thus, according to the teachings of the present invention there is also provided a method of reducing theft of a vehicle identification tag from a vehicle, comprising: a) providing a vehicle identification tag including a casing and a vehicle identification circuit associated with the casing; and b) securing the vehicle identification tag to a vehicle using a first adhesive to form a first adhesion, so that a structural strength of at least a part of the casing is weaker than the first adhesion. In embodiments, a part of the casing having a structural strength weaker than the first adhesion is a material from which the casing is made. In embodiments, a part of the casing having a structural strength weaker than the first adhesion is a weak point of the casing, in embodiments, the weak point is a seam between two parts of the casing. In embodiments, a portion of the vehicle identification circuit passes through a part of the casing weaker than the first adhesion. In embodiments, the method further comprises placing a fuel inlet pipe of the vehicle through a loop-shaped antenna of the vehicle identification circuit.

According to the teachings of the present invention there is also provided a vehicle identification tag, comprising: a) a vehicle identification circuit; and b) associated with the vehicle identification circuit, a casing having at least one weak point and configured so that when the casing breaks at the weak point, the vehicle identification circuit is rendered substantially inoperable.

In embodiments, the vehicle identification circuit comprises a radio-frequency transponder.

In embodiments, the vehicle identification circuit is a passive vehicle identification circuit.

In embodiments, the casing comprises a surface configured to engage an adhesive suitable for attachment to a vehicle surface, e.g. painted metal.

In embodiments, the casing comprises an adhesive surface, the adhesive surface configured to adhere to a vehicle surface, e.g., painted metal.

In embodiments, the vehicle identification tag further comprises a protective cover covering the adhesive surface, that when removed the adhesive surface is exposed.

In embodiments, an adhesive surface comprises a first adhesive, the first adhesive configured to form an adhesion with a vehicle surface stronger than the weak point of the casing.

In embodiments, the adhesive surface further comprising a second adhesive, the second adhesive configured to form an adhesion with a vehicle surface weaker than an adhesion formed by the first adhesive.

In embodiments, the vehicle identification circuit is embedded within the casing.

In embodiments, the casing comprises i) a first casing part including a first portion of the vehicle identification circuit; and ii) a second casing part including a second portion of the vehicle identification circuit configured to mate with the first casing part wherein the vehicle identification circuit is configured to be operable when the second casing part is properly mated to the first casing part and substantially inoperable when the second casing part is improperly mated to the first casing part. In embodiments, a weak point of the casing is a seam between the first casing part and the second casing part. In embodiments, the first casing part is secured to the second casing part with a second adhesive.

In embodiments, the casing comprises at least two mated parts, wherein a connection between the mated parts constitutes a weak point. In embodiments, the connection between two mated parts comprises an adhesion by a second adhesive.

In embodiments, a portion of the circuit passes through a weak point of the casing.

In embodiments, a portion of the identification circuit passing through a weak point is a portion of an antenna.

In embodiments, the vehicle identification circuit includes a substantially loop-shaped antenna including a hole (in embodiments at least about 4 cm in diameter or even at least about 6 cm in diameter) configured to fit over a fuel inlet pipe of a vehicle (e.g., an automobile, a truck, a boat, an aircraft).

In embodiments, the substantially loop-shaped antenna is associated with a substantially loop-shaped portion of the casing.

According to the teachings of the present invention there is also provided a kit, comprising a) a vehicle identification tag, in embodiments such as described above and b) a first adhesive configured to form an adhesion between the vehicle identification tag and a vehicle surface, the adhesion stronger than a weak point of the tag.

According to the teachings of the present invention there is also provided a vehicle identification tag, comprising a) a vehicle identification circuit and b) associated with the vehicle identification circuit, a casing comprising an adhesive surface provided with a first adhesive configured to form a first adhesion with a vehicle surface (e.g., of painted metal) wherein the structural strength of at least part of the casing is weaker than the first adhesion. In embodiments, a portion of the vehicle identification circuit passes through a part of the casing weaker than the first adhesion. In embodiments, breaking of the part of the casing weaker than the first adhesion renders the vehicle identification circuit substantially inoperable.

In embodiments the vehicle identification circuit comprises a radio-frequency transponder. In embodiments, the vehicle identification circuit is a passive vehicle identification circuit.

In embodiments, the tag further comprises a protective cover covering the adhesive surface, configured so that when removed the adhesive surface is exposed.

In embodiments, the adhesive surface further comprises a second adhesive, the second adhesive configured to form an adhesion with a vehicle surface weaker than the first adhesion formed by the first adhesive.

In embodiments, the vehicle identification circuit is embedded within the casing.

In embodiments, the casing comprises i) a first casing part including a first portion of the vehicle identification circuit; and ii) a second casing part including a second portion of the vehicle identification circuit configured to mate with the first casing part wherein the vehicle identification circuit is configured to be operable when the second casing part is properly mated to the first casing part and substantially inoperable when the second casing part is improperly mated to the first casing part. In embodiments, the part of the casing weaker than the first adhesion is a seam between the first casing part and the second casing part. In embodiments, the first casing part is secured to the second casing part with a second adhesive.

In embodiments, the casing comprises at least two mated parts, wherein a connection between the mated parts constitutes a part of the casing weaker than the first adhesion. In embodiments, the connection between the two mated parts comprises an adhesion formed in part by a second adhesive.

In embodiments, a portion of the circuit passes through a part of the casing weaker than the first adhesion. In embodiments, the portion of the circuit passing through the part of the casing weaker than the first adhesion is a portion of an antenna.

In embodiments, the vehicle identification circuit includes a substantially loop-shaped antenna including a hole (in embodiments at least about 4 cm in diameter or even at least about 6 cm in diameter) configured to fit over a fuel inlet pipe of a vehicle (e.g., an automobile, a truck, a boat, an aircraft).

In embodiments, the substantially loop-shaped antenna is associated with a substantially loop-shaped portion of the casing.

In unpublished pending U.S. Patent Application No. 60/762,498 of the applicant is disclosed a system for authorizing purchases associated with vehicles including both a passive and an active identification tag associated with a vehicle to increase security. In embodiments, the active identification tag acts as a meter device, recording data associated with vehicle use including driving behavior. A ninth aspect of the present invention is of a meter device recording vehicle use and is configured to act as an active identification tag characterized in being entirely self-contained, so as to be simple to install and substantially tamper resistant.

Thus, according to the teachings of the present invention is provided a meter device for recording, storing and transmitting data related to vehicular operation, comprising: a) a measuring component configured to periodically determine data relating to a location of the meter device (e.g., based on transmissions of a cellular telephone network, a dedicated location network, space based radio-transmission such as GPS (global positioning system)) and a memory for recording data related to the location data; b) a timer and a memory for recording data related to output of the timer; c) a unique device identifier stored in a memory; d) a wireless transceiver with a passive mode wherein the transceiver is configured to receive transmissions from a service station controller and an active mode wherein the transceiver is configured to transmit the recorded data; and e) an integral power storage unit.

In embodiments, the attachment component is configured to fix the device in proximity of a vehicle windshield, for example dashboard or to the vehicle windshield, for example includes adhesive, a magnet or a suction cup.

In embodiments, the meter device includes a photovoltaic component configured to generate electrical energy from light and to recharge the integral power storage unit. In embodiments, the meter device includes a generator to convert mechanical energy from movement of the device into electrical energy to recharge the integral power storage unit.

In embodiments, the device includes a data processing component configured to process the location data to produce the related data, for example to calculate a distance (such as distance traveled) from the location data, to calculate a velocity from the location data, to calculate acceleration from the location data or to calculate a turning rate from the location data.

In embodiments, the meter device includes an energy-saving sleep mode and a vehicle use detector, wherein the device enters and exits the sleep mode based on output of the vehicle use detector. In embodiments, the vehicle use detector includes a vehicle occupant detector, a vehicle motion detector or an engine activity detector (for example, detecting engine sound).

BRIEF DESCRIPTION OF THE DRAWINGS

The invention is herein described, by way of example only, with reference to the accompanying drawing. With specific reference now to the drawing in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawing making apparent to those skilled in the art how the several forms of the invention may be embodied in practice.

In the drawings.

DESCRIPTION OF EMBODIMENTS OF THE INVENTION

Figure 1A:
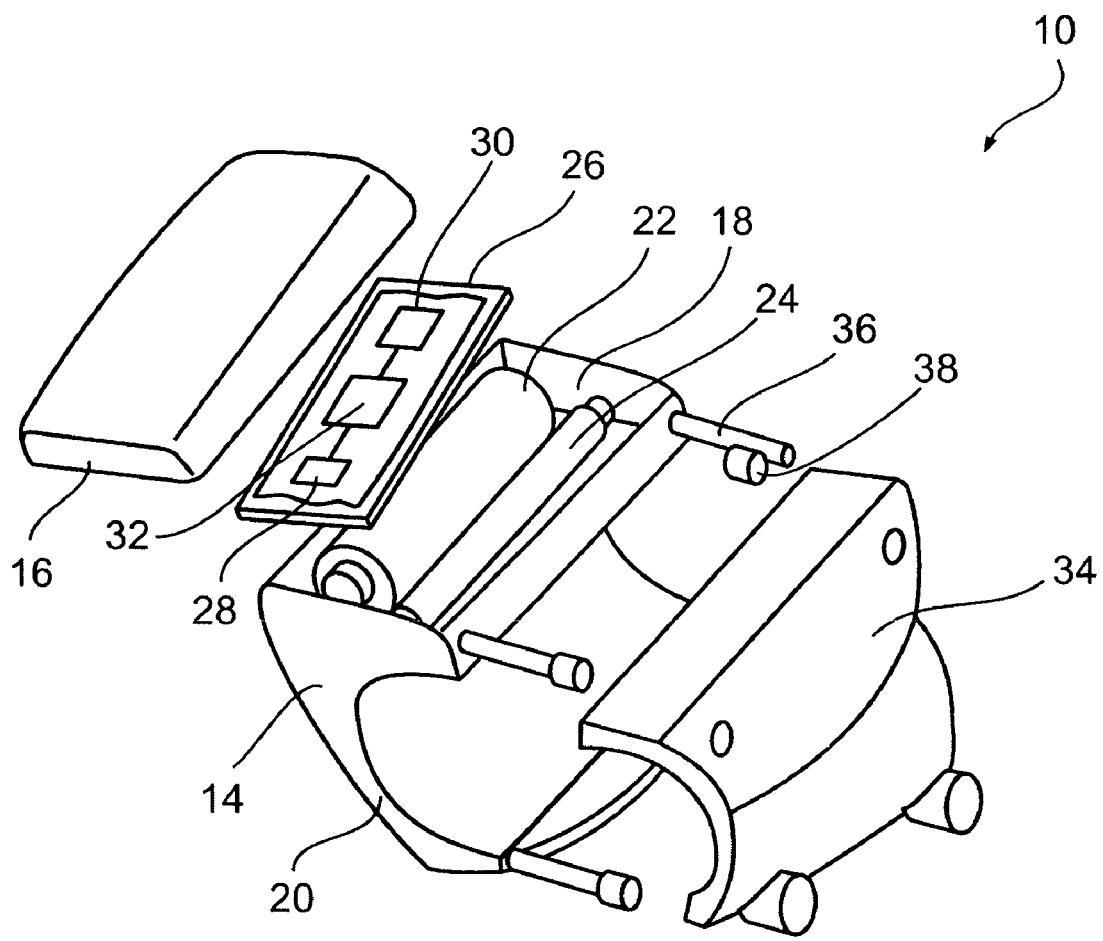
FIGS. 1A and 1B are schematic depictions of an identification tag reader including an identification tag reading transceiver sealed within a casing in accordance with the first aspect of the present invention.

The present invention is of methods and devices, embodiments of which are useful for implementing purchase authorization systems for purchases associated with a vehicle.

The principles, uses and implementations of the teachings of the present invention may be better understood with reference to the accompanying description and figures. Upon perusal of the description and figures present herein, one skilled in the art is able to implement the teachings of the present invention without undue effort or experimentation.

Before explaining at least one embodiment of the invention in detail, it is to be understood that the invention is not limited in its application to the details set forth herein. The invention can be implemented with other embodiments and can be practiced or carried out in various ways. It is also understood that the phraseology and terminology employed herein is for descriptive purpose and should not be regarded as limiting.

Generally, the nomenclature used herein and the laboratory procedures utilized in the present invention include techniques from the fields of computer science, commerce, communications, material sciences and engineering. Such techniques are thoroughly explained in the literature. Unless otherwise defined, all technical and scientific terms used herein have the same meaning as commonly understood by one of ordinary skill in the art to which the invention belongs. In addition, the descriptions, materials, methods and examples are illustrative only and not intended to be limiting. Methods and materials similar or equivalent to those described herein can be used in the practice or testing of the present invention. All publications, patent applications, patents and other references mentioned are incorporated by reference in their entirety as if fully set forth herein. In case of conflict, the terms are to be understood as used in the specification.

As used herein, the terms "comprising" and "including" or grammatical variants thereof are to be taken as specifying the stated features, integers, steps or components but do not preclude the addition of one or more additional features, integers, steps, components or groups thereof. These terms encompass the terms "consisting of" and "consisting essentially of".

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The term "method" refers to manners, means, techniques and procedures for accomplishing a given task including, but not limited to, those manners, means, techniques and procedures either known to, or readily developed from known manners, means, techniques and procedures by practitioners of the relevant arts. Implementation of the methods of the present invention involves performing or completing selected tasks or steps manually, automatically, or a combination thereof.

Herein, the term "passive device" refers to a device that stores data (whether read-only or rewritable) that does not have an own power source. The term encompasses such devices as bar codes. The term also encompasses data storage devices that receive an amount of power from a reader by induction and then use the received power to transmit the data, such as RFID tags and circuits.

Herein, the term "active device" refers to a device associated with a power source that stores data (whether read-only or rewritable) where the device is configured to transmit the data using power from the associated power source.

Herein, the term "fuel dispenser" refers to a device that dispenses fuel, for example to a vehicle, and generally includes a pump, at least one hose and at least one fuel-dispensing nozzle with a fuel dispensing actuator such as a trigger.

Service stations are rarely constructed a priori for electronic payment and vehicle identification. Rather, a service station generally includes a mechanical fuel-dispensing nozzle. When it is desired to upgrade a service station with the installation of an electronic payment system based on reading a vehicle identification tag, such as a vehicle identification tag attached in proximity of the vehicle refueling port, it is usually necessary to retrofit a vehicle identification tag reader to each fuel-dispensing nozzle with a dedicated power source. One approach is to run a power and communication cable from the service station controller underground to each fuel-dispensing pump in channels that exist for the standard fuel dispensing control system. The power and communication cable is then run in parallel to a fuel-dispensing hose to connect to an identification tag reader attached to the fuel dispensing nozzle. The installation of such identification tag readers is very expensive and difficult to retrofit. Such systems also constitute a safety hazard due to the proximity of a long and vulnerable power cable to a fuel-dispensing hose filled with highly flammable gasoline. An alternative is an electricity generator powered by fuel flowing through the fuel-dispensing hose as taught in U.S. Pat. No. 6,648,032. A disadvantage of such an electricity generator is that at least one additional fuel resistant seal is required in the fuel-dispensing nozzle, increasing the chance of fuel leakage. Since there are many different models of fuel-dispensing nozzles, it is necessary to provide at least one model of the electricity generator for each fuel-dispensing nozzle model, increasing installation, maintenance and logistical costs. Further, to transfer generated electricity from the generator to an identification tag reader requires a wire running on the outside of the fuel dispensing nozzle, constituting a safety hazard and increasing the costs of installation.

Fuel-dispensing nozzles are exposed to extreme conditions: located outside in extreme cold, heat, subject to dust and wind and exposed not only to humidity but also to gasoline. The identification tag readers known in the art are provided with openings into the tag reader casing for the required power and communication cables. Such openings constitute a vulnerable point to the elements. Further, such openings may provide access to the electronics of the identification tag reader allowing illicit use.

As noted above, a first aspect of the present invention is of a vehicle identification tag reader that is simple to install or retrofit and is exceptionally safe and durable due to the fact that components are sealed within a casing.

An exemplary embodiment of the first aspect of the present invention, identification tag reader 10 is depicted in FIGS. 1A (exploded) and 1B (assembled) attached to a fuel-dispensing nozzle 12.

In FIG. 1A components of identification tag reader 10 are shown including a lower casing part 14 and an upper casing part 16. Lower casing part 14 is a monolithic component of molded fiber-reinforced polymer (e.g., Nylon) and includes an open chamber 18 and a clamping jaw 20. Upper casing part 16 is configured to fit to upper casing part 16, closing open chamber 18. Configured to fit inside chamber 18 are power storage unit 22 (a rechargeable battery), a recharging unit including an induction coil 24, and a populated circuit board 26 including an identification tag reading transceiver 28, a station communication transceiver 30 and a control processor 32. Opposing clamping jaw 34 is attachable to lower casing part 14 with the help of four bolts 36 and four nuts 38.

Manufacture of the components of identification tag reader 10 is well within the ability of one skilled in the art without undue experimentation upon perusal of the description herein. Assembly of identification tag reader 10 is straightforward and substantially as depicted in FIG. 1A, including placing power storage unit 22, induction coil 24 and populated circuit board 26 inside chamber 18. Once the components are placed inside chamber 18, upper casing part 16 is properly placed and secured to lower casing part 14 so as to seal chamber 18, using methods known in the art such as the use of adhesives, welding or soldering. In embodiments, casing parts 14 and 16 of fiber reinforced polymers are attached by ultrasonic welding to provide a seamless monolithic casing having a sealed chamber having no openings that contains power storage unit 22, induction coil 24 and populated circuit board 26.

In identification tag reader 10, identification tag reading transceiver 28 and other components are enclosed within a sealed chamber 18 inside the casing made of casing parts 14 and 16. In embodiments, an identification tag transceiver such as 28 and other components are embedded within a casing for example during a molding or other production process.

Figure 1B:
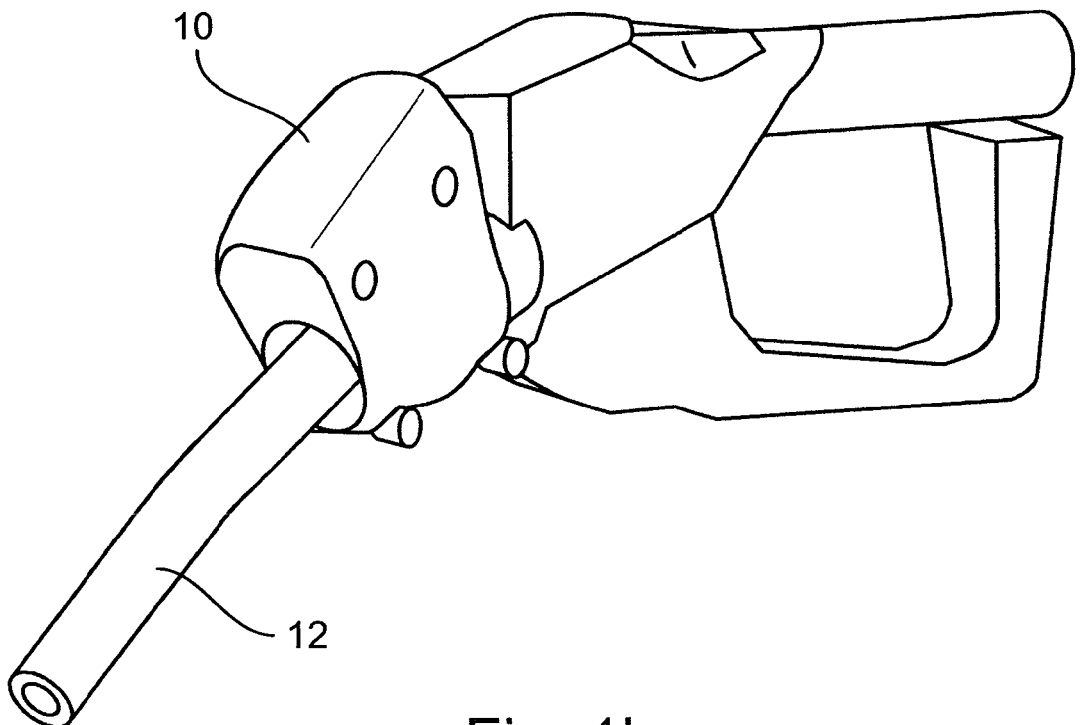

As depicted in FIG. 1B, for installation clamping jaw 20 and opposing clamping jaw 34 are placed around a fuel-dispensing nozzle 12 and clampingly secured with the use of nuts 38 and bolts 36. As attachment and detachment of identification tag reader 10 requires simple clamping about a fuel dispensing nozzle 12 and requires neither disassembly of any component thereof nor attachment and securing of any cables or wires, installation is simple and can be performed by a person with no special training or education. Further, the simplicity and ease of assembly and disassembly allows the identification tag reader to be replaced at low cost, whether for a periodic hardware upgrade or as a result of malfunction.

Use of identification tag reader 10 attached to fuel dispensing nozzle 12 is simple and analogous to prior art identification tag readers or to tag readers as described in unpublished pending U.S. Patent Application No. 60/762,498 of the Applicant. In a simple embodiment, fuel-dispensing nozzle 12 is placed inside the refueling port of a vehicle provided with an identification tag (such as an RFID tag) so that identification tag reader 10 is within read range of the identification tag. Identification tag transceiver 28 is activated to read the identification tag and transmits signals to the identification tag. The identification tag receives power from the transmitted signal and then retransmits, for example, an identification tag identifier. Identification tag transceiver 28 receives and forwards the identification tag identifier to control processor 32 that forwards the identification tag identifier, using station communication transceiver 30 to a service station controller. Based on various data and policies including the identification tag identifier, a service station controller transmits a refueling authorization to the fuel pump associated with fuel dispensing nozzle 12 and fuel is dispensed to the vehicle in the usual way.

Although identification tag reader 10 depicted in FIGS. 1A and 1B is configured for attachment to a fuel-dispensing nozzle 12 with the use of clamping components, other configurations of attachment are also found within the scope of the invention. For example, in non-depicted embodiments an identification tag reader is configured to be attached to a fuel dispensing nozzle using a constriction component, e.g., a component resembling a prior art flexible tie. For example, in embodiments, a casing is provided with integrally formed loops through which prior art plastic ties are threaded and the plastic ties are then looped and constricted about a fuel-dispensing nozzle.

Although identification tag reader 10 depicted in FIGS. 1A and 1B is provided with two separate transceivers, identification tag reading transceiver 28 for reading a vehicle identification tag and station communication transceiver 30 for communicating with a service station controller, in embodiments an identification tag reader is provided with a single transceiver that is configured both for reading an identification tag and for communicating with a service station controller.

As noted above, identification tag reader 10 depicted in FIGS. 1A and 1B is not provided with a continuous supply of power but rather uses energy stored in power storage unit 22. In embodiments, an identification tag reader of the present invention is configured (for example, using an appropriately configured control processor) to issue a warning, for example using a station communication transceiver, of low power in power storage unit 22. In embodiments, an identification tag reader of the present invention is disposable, that is to say, once power storage unit 22 is empty the identification tag reader is replaced. In contrast, identification tag reader 10 depicted in FIGS. 1A and 1B is provided with a recharging unit including an induction coil 24 in accordance with the fifth aspect of the present invention. Periodically, or when power storage unit 22 is low on power, a recharging professional recharges power storage unit 22 with the help of induction coil 24.

In embodiments of the present invention, such as identification tag reader 10, an identification tag reader is configured to operate with as little energy as possible to reduce costs associated with charging or replacing an identification tag reader.

For saving energy, in embodiments, a station communication transceiver such as 30 has at least three modes. A first mode is an active mode, wherein the station communication transceiver is operative to transmit signals and to receive transmissions from the service station controller. The first mode is the mode used, for example, during the actual reading of an identification tag and receiving of refueling authorization. A second mode is a rest mode, wherein the station communication transceiver is operative to receive transmissions from the service station controller but does not transmit. A third mode is a sleep (energy-saving) mode wherein the station communication transceiver substantially reduces energy usage to a minimum, as is known in the art. For example, in embodiments, a station communication transceiver enters a sleep mode after a predetermined period of inactivity or upon receipt of a command from a service station controller. In embodiments, a station communication transceiver enters the rest mode from the sleep mode upon detection of use, e.g., when the identification tag reader is moved for use. In embodiments, a station communication transceiver enters the rest mode from the sleep mode periodically according to a predetermined schedule. In embodiments, a station communication transceiver enters the active mode from the rest mode upon receipt of a transmission from a service station controller.

For saving energy, in embodiments, an identification tag reading transceiver such as 28 has at least two modes. A first mode is an active mode, wherein the identification tag reading transceiver is operative to transmit signals and to receive return transmissions from an identification tag. The first mode is the mode used, for example, during the actual reading of a vehicle identification tag and receiving of refueling authorization. A second mode is a sleep (energy-saving) mode, wherein the identification tag reading transceiver substantially reduces energy usage to a minimum, as is known in the art. For example, in embodiments an identification tag reading transceiver enters a sleep mode after a predetermined period of inactivity (e.g., after refueling authorization has been received or after the refueling process has finished) or upon receipt of a command from a service station controller. In embodiments, an identification tag reading transceiver enters the rest mode from the sleep mode upon detection of use, e.g., when the identification tag reader is moved for use. In embodiments, an identification tag reading transceiver enters the active mode from the rest mode upon receipt of a transmission from a service station controller, for example via a control processor such as 32 and a station communication transceiver such as 30.

In order to assist in determining if an identification tag reader is being used, for example for activating an identification tag reading transceiver or a station communication transceiver as described above, in embodiments an identification tag reader of the present invention includes a use detector, configured to detect that a fuel-dispensing nozzle to which the identification tag reader is attached is to be used. In embodiments, the use detector is a movement detector configured to detect movement of a fuel-dispensing nozzle to which the tag reader is attached. For example, in embodiments a tag reader includes a liquid mercury switch. When a fuel-dispensing nozzle to which a tag reader is attached is held in a cradle and not moved, the switch is closed. When the fuel-dispensing nozzle is removed from the cradle for dispensing fuel, the liquid mercury sloshes inside the switch, closing the circuit and indicating that the tag reader and consequently the fuel-dispensing nozzle has been moved.

Figure 2:
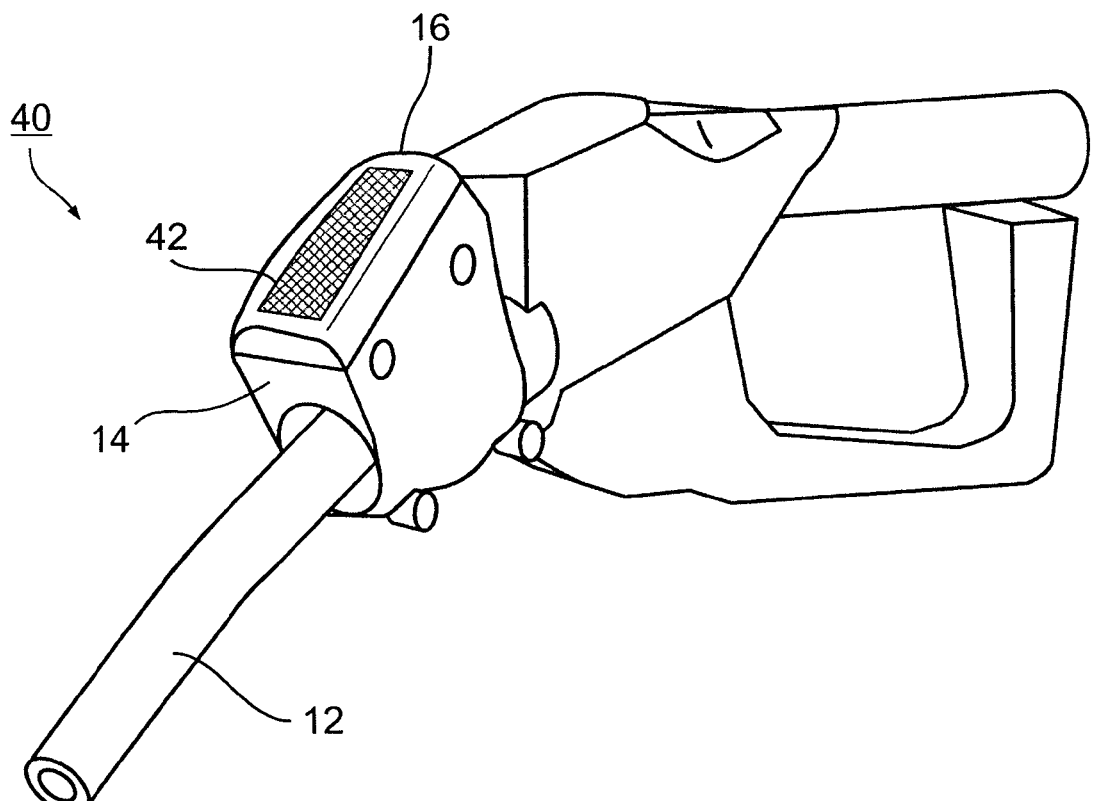
FIG. 2 is a schematic depiction of an identification tag reader including a photovoltaic cell in accordance with the second aspect of the present invention.

As noted above, a second aspect of the present invention is of a vehicle identification tag reader that includes one or more photovoltaic cell to provide power for an associated tag reading transceiver. An exemplary embodiment of the second aspect of the present invention, identification tag reader 40 is depicted in FIG. 2 attached to a fuel-dispensing nozzle 12. Identification tag reader 40 is substantially similar to identification tag reader 10 discussed above but is devoid of an induction coil 24 and is instead provided with a photovoltaic cell 42 configured to convert light to electrical energy to recharge a respective power storage unit 22. Photovoltaic cell 42 of identification tag reader 40 is embedded inside transparent upper casing part 16 which is secured to lower casing part 14 so that the casing is monolithic and seamless: in identification tag reader 40 upper casing part 16 is fashioned from nylon not reinforced by glass fibers in order to increase the transparency of upper casing part 16 to the wavelength of light required by photovoltaic cell 42.

The manufacture, assembly and use of identification tag reader 40 are substantially similar to the manufacture, assembly and use of identification tag reader 10 as described above.

Although photovoltaic cell 42 of identification tag reader 40 is sealed within upper casing part 16, in embodiments photovoltaic cell is otherwise associated with an identification tag reader.

Although identification tag reader 40 incorporates the first aspect of the present invention by having an identification tag reading transceiver as well as other components enclosed within a sealed chamber, in embodiments the identification tag reading transceiver is associated with the casing without being enclosed within.

Figure 3A:
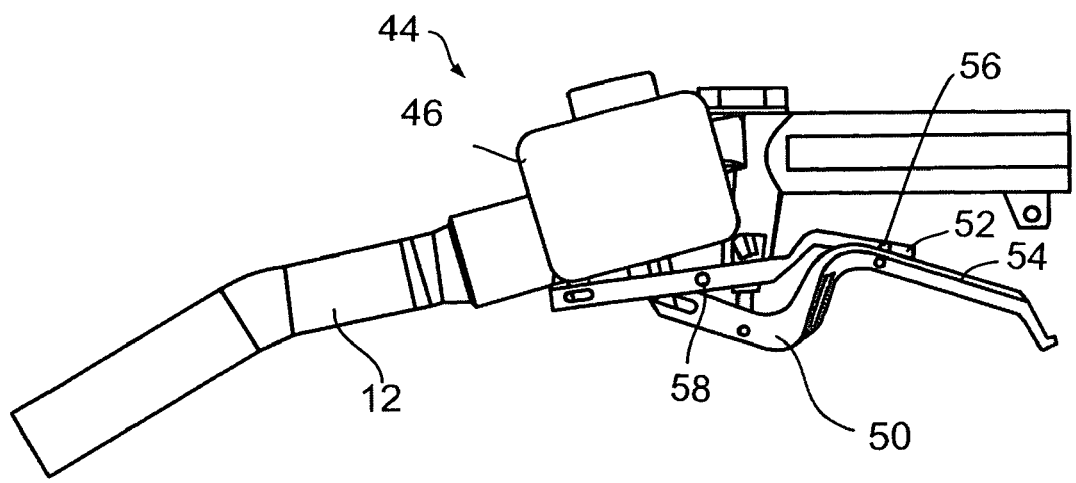
FIGS. 3A-3E are schematic depiction of an identification tag reader including a trigger operated generator in accordance with the third aspect of the present invention.
Figure 3B:
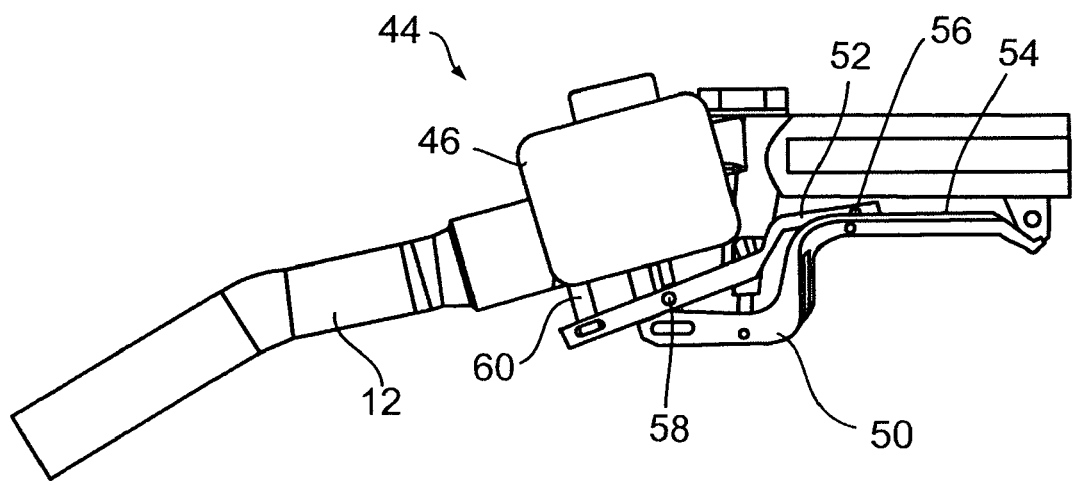
Figure 3C:
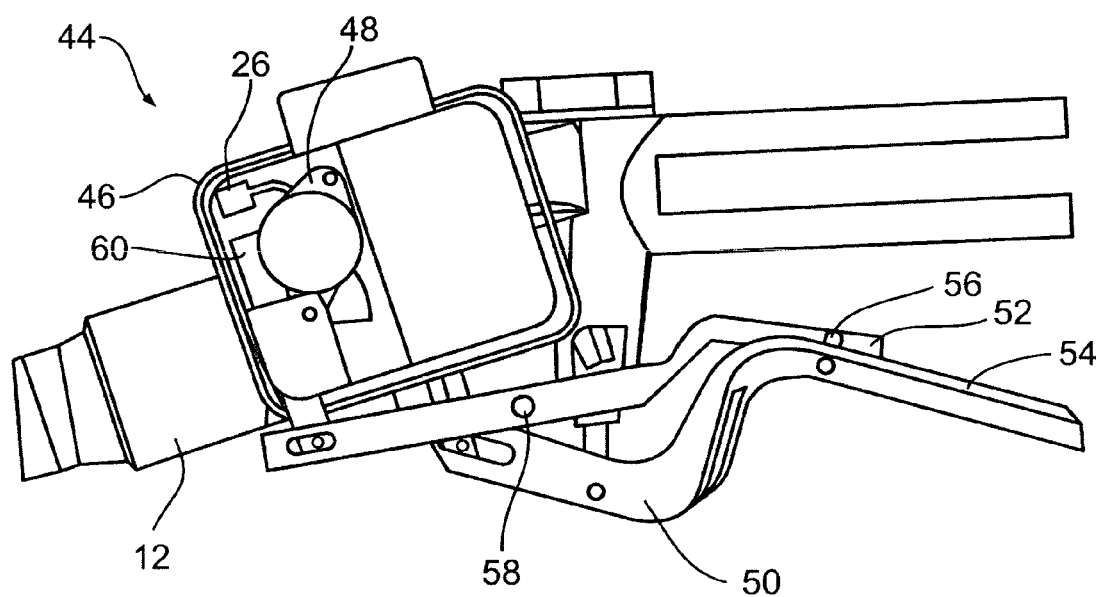

As noted above, a third aspect of the present invention is of a vehicle identification tag reader that includes a trigger powered electricity generator to provide power for the associated tag reading transceiver. An exemplary embodiment of the third aspect of the present invention, identification tag reader 44 attached to a fuel dispensing nozzle 12 is depicted in FIGS. 3A-3E. Identification tag reader 44 is substantially similar to identification tag reader 10 discussed above in that within casing 46 (as depicted in FIG. 3C) are contained components such as a power storage unit 22, and a populated circuit board 26 including an identification tag reader 28, a station communication transceiver 30 and a control processor 32.

Unlike identification tag reader 10 depicted in FIGS. 1A and 1B where power storage unit 22 is configured to supply electrical power, power storage unit 22 of identification tag reader 44 is a component of power generation unit 48 that also includes a coil spring 62 and an electricity generator 64 that is activated by the compression of trigger 50 of fuel dispensing nozzle 12.

For installation, identification tag reader 44 is secured to fuel dispensing nozzle 12 in any suitable way, for example with clamping components or constricting components (not depicted). During installation, charging arm 52 is placed in sliding contact with upper surface 54 of trigger 50, for example with the help of plastic tie 56.

Use of identification tag reader 44 attached to fuel dispensing nozzle 12 is substantially as described above. Fuel-dispensing nozzle 12 is placed inside the refueling port of a vehicle provided with an identification tag (such as an RFID tag) so that identification tag reader 44 is within read range of the identification tag. Identification tag transceiver 28 is activated to read the identification tag and transmits signals to the identification tag. The identification tag receives power from the transmitted signal and then retransmits, for example, an identification tag identifier. Identification tag transceiver 28 receives and forwards the identification tag identifier to control processor 32 that forwards the identification tag identifier, using station communication transceiver 30 to a service station controller. Based on various data and policies including the identification tag identifier, the service station controller transmits a refueling authorization to the fuel pump associated with fuel dispensing nozzle 12 and fuel is dispensed to the vehicle in the usual way.

Figure 3D:
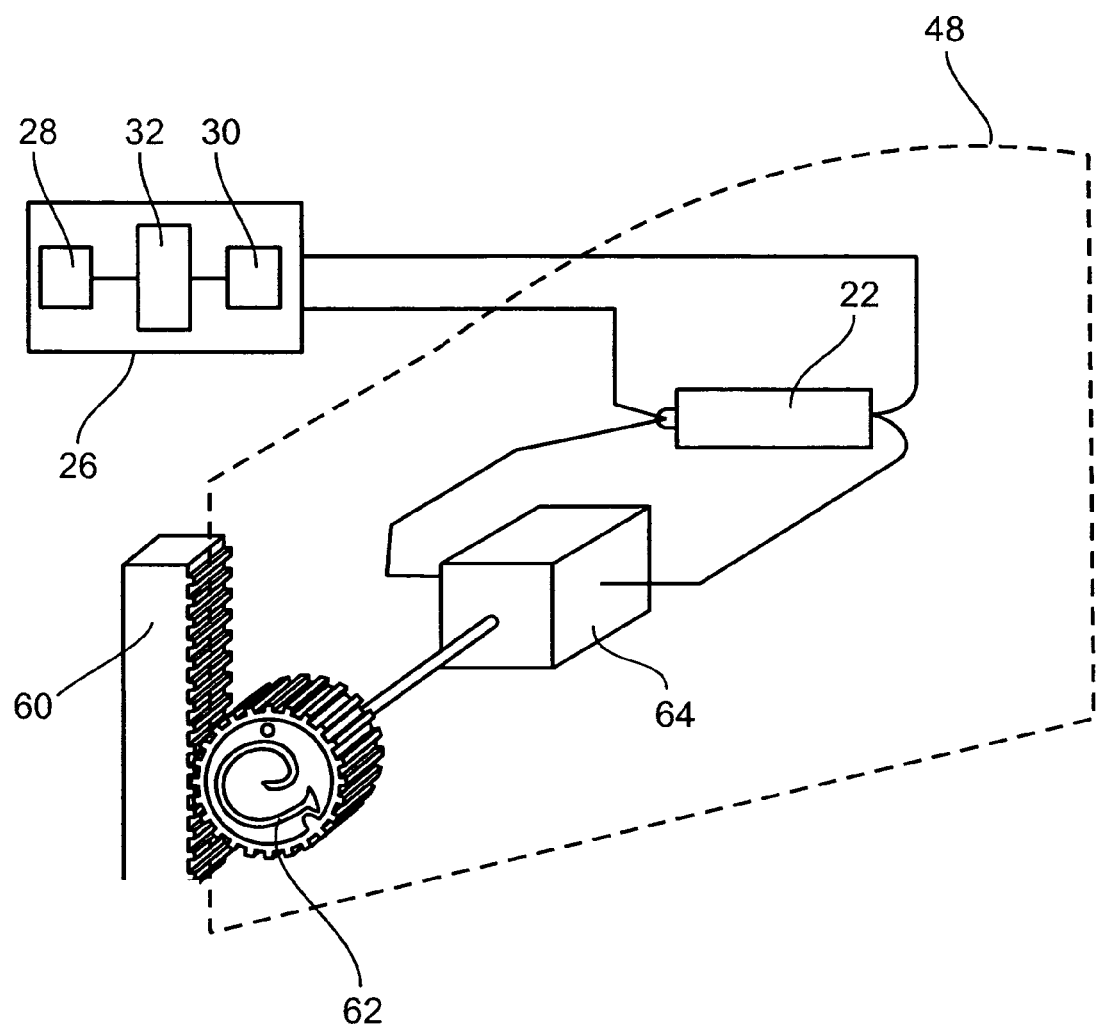
Figure 3E:
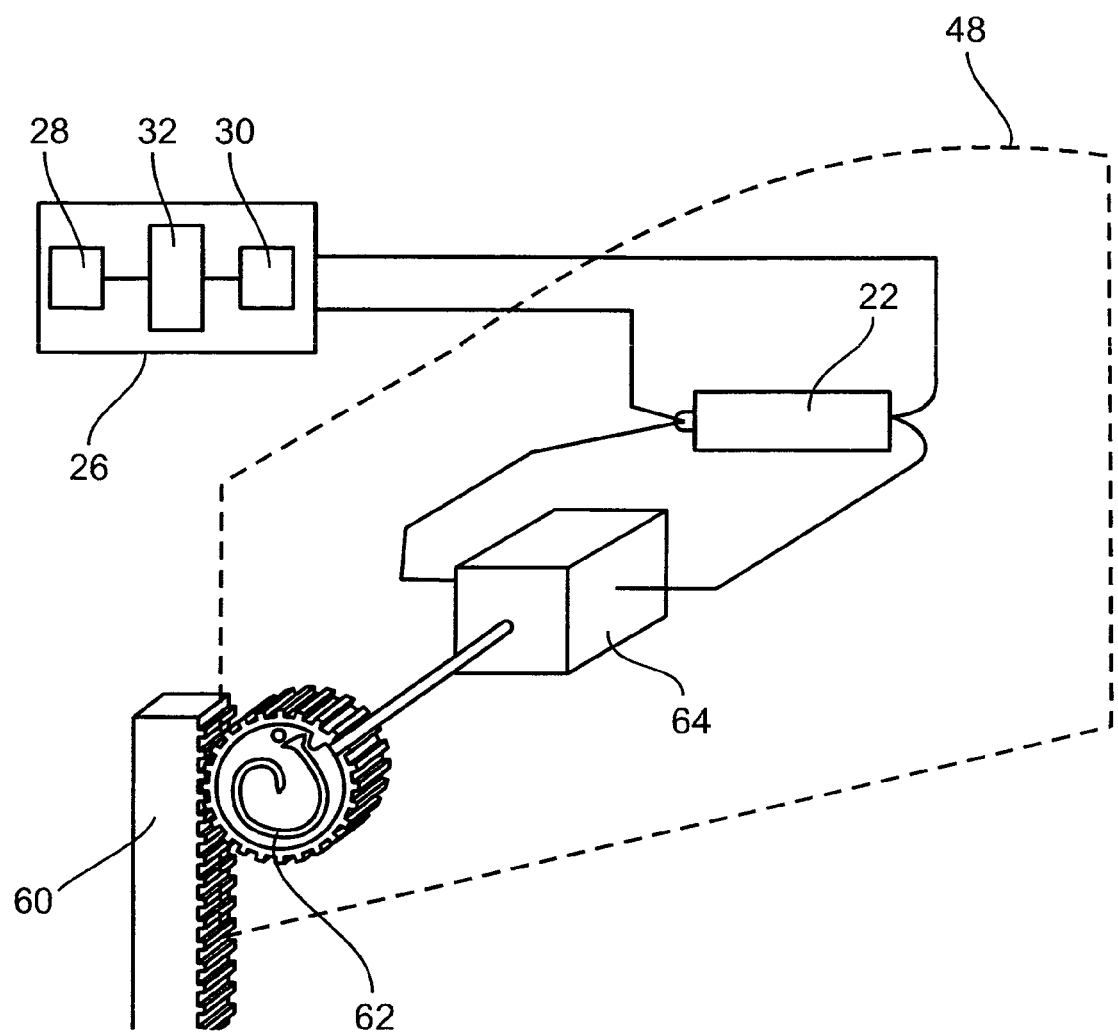

In embodiments, the reading of an identification tag as described above begins and continues with the use of power stored in power storage unit 22 of power generation unit 48. When trigger 50 is pulled upwards (from a state as depicted in FIGS. 3A, 3C and 3D to a state depicted in FIGS. 3B and 3E) to dispense fuel from fuel dispensing nozzle 12, charging arm 52 is pushed upwards and pivots around axis 58, pulling piston 60 which winds coil spring 62 coupled to electricity generator 64. When trigger 50 reaches an uppermost location, coil spring 62 unwinds, driving electricity generator 64. Power from electricity generator 64 recharges power storage unit 22.

In embodiments, the reading of an identification tag as described above is initiated only subsequent to pulling of trigger 50. In embodiments, reading initiation subsequent to pulling trigger 50 is in order to use energy generated by electricity generator 64 for powering identification tag reading transceiver 28. In embodiments of such embodiments, an identification tag reader is devoid of a power storage unit 22 and runs only on trigger-generated power.

In embodiments, the generation of power by electricity generator 64 initiated by pulling of trigger 50 is utilized as a use-detector for changing a mode in which an identification tag reading transceiver or a station communication transceiver (e.g., 28) is found, as described above.

Figure 4:
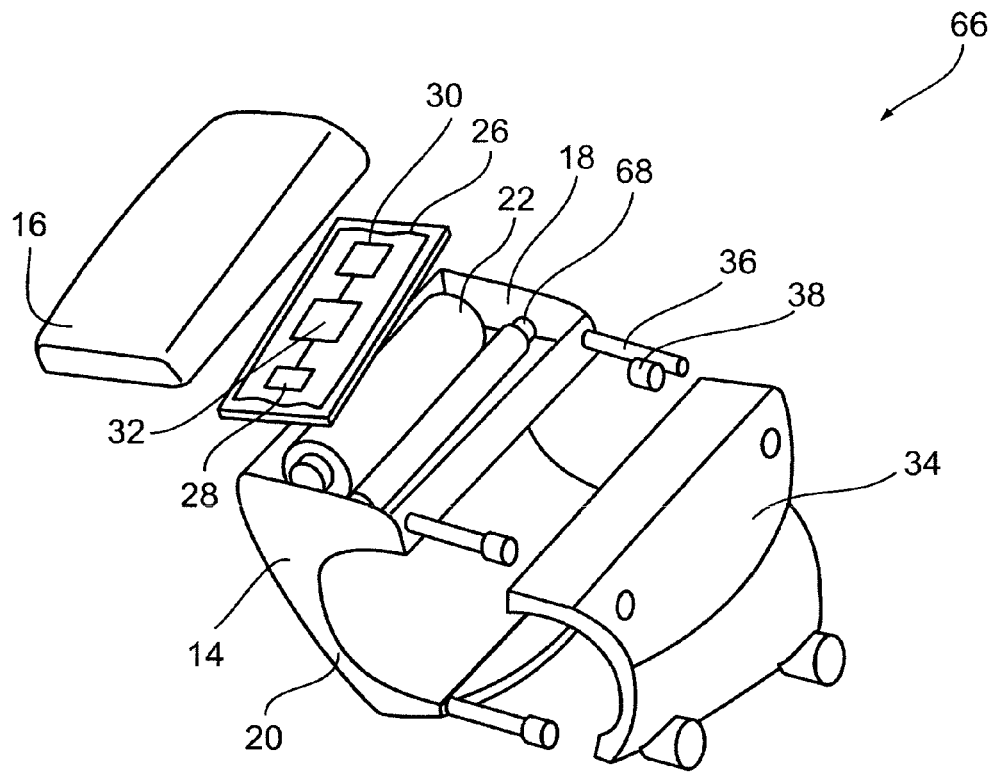
FIG. 4 is a schematic depiction of a identification tag reader including a movement operated generator in accordance with the fourth aspect of the present invention.

As noted above, a fourth aspect of the present invention is of a vehicle identification tag reader that includes a generator to convert mechanical energy from movement of the tag-reader into electrical energy to recharge the power storage unit, analogously to the kinetic power generators known in the art of portable timepieces. An exemplary embodiment of the fourth aspect of the present invention, identification tag reader 64 is depicted exploded in FIG. 4. Identification tag reader 66 is substantially similar to identification tag reader 10 discussed above in that within a casing comprising casing parts 14 and 16 are contained components such as a power storage unit 22, and a populated circuit board 26 including an identification tag reader 28, a station communication transceiver 30 and a control processor 32. Unlike identification tag reader 10 depicted in FIGS. 1A and 1B including an induction coil 24 for recharging power storage unit 22, identification tag reader 66 includes kinetic power generation unit 68, similar to the described in U.S. Pat. No. 6,154,422. In the art it is known that motion (such as shaking, moving or jostling) of an object with which a kinetic power generation unit 68 is associated activates the mechanism therein to generate electricity.

Manufacture, assembly and attachment of an identification tag reader 66 to a fuel dispensing nozzle 12 is similar to the described above and is clear to one skilled in the art upon perusal of the description herein.

Use of an identification tag reader 66 is substantially identical to the use of an identification tag reader 44 with a significant exception that power is generated with the motion of a fuel dispensing nozzle to which the identification tag reader is attached and not only subsequent to pulling of the respective trigger.

An advantage of an identification tag reader embodying the third aspect of the present invention such as 44 or embodying the fourth aspect of the present invention such as 66 is in that both incorporate an integrated power generator that is activated by movement of the respective fuel-dispensing nozzle 12 but prior to the actual need of energy by a respective identification tag reading transceiver 28.

Figure 5:
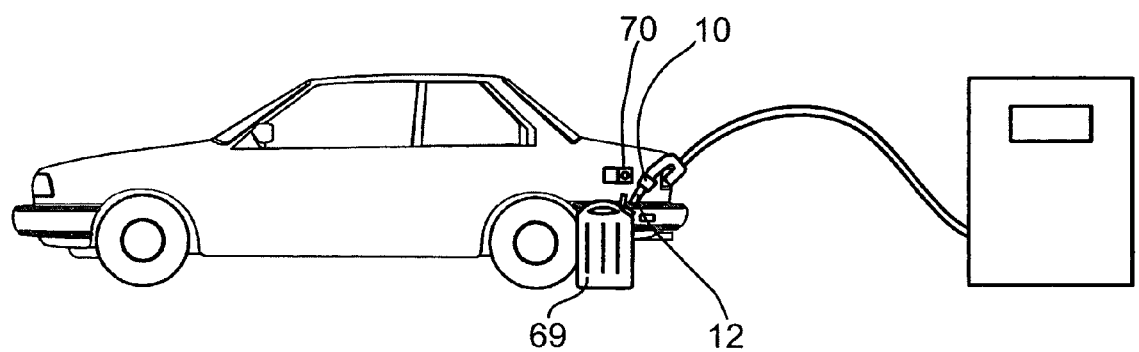
FIG. 5 (prior art) is a schematic depiction of fuel theft made difficult by the sixth aspect of the present invention.

In the art a known type of fuel theft from a service station provided with a fuel dispensing authorization system based on using passive vehicle identifications tags is that subsequent to receipt of authorization, fuel is dispensed into an alternate vessel (e.g., a jerrycan 69 or a soft-drink bottle) as depicted in FIG. 5 and not into a vehicular fuel tank. Such theft is based on placing a fuel-dispensing nozzle 12 in proximity of a refueling port 70 so that an identification tag reader 10 reads an identification tag while fuel-dispensing nozzle 12 is not inside refueling port 70 but close enough that identification tag reader 10 reads the identification tag in refueling port 70. As noted above, a sixth aspect of the present invention is of a method and vehicle identification tag reader that are resistant to fuel theft, such as the fuel theft described above, by use of a variable range identification tag reader. Suitable variable range identification tag readers are Picoread™ from Contactless, Aix-en-Provence, France.

The sixth aspect of the present invention is potentially implemented with most prior art vehicle identification tag readers and also with vehicle identification tag readers of the present invention. The sixth aspect of the present invention is currently believed to be most effective using an identification tag reader where the identification tag reading transceiver is secured to a fuel dispensing nozzle so as to be positioned as close as possible to the expected location of a vehicle identification tag as embodied, for example, in identification tag reader 10 depicted in FIGS. 1A and 1B. Implementing the sixth aspect of the present invention generally involves modifying an identification tag reading transceiver and/or a control processor of an identification tag reader to include or be functionally associated with a transmission power controller configured to change the power level of transmission of the tag reading transceiver. Such transmission power controllers are commercially available and are well known to one skilled in the art.

According to the method of the sixth aspect of the present invention, a fuel-dispensing nozzle provided with an identification tag reader is placed in proximity of a refueling port of vehicle provided with a passive vehicle identification tag. As part of the fuel dispensing authorization process, the identity of the vehicle with which the passive vehicle identification tag is associated is determined.

The identification tag reading transceiver transmits a read signal in the usual way, where the power level of the transmitted read signal is determined to be substantially as low as possible to ensure that a response is received from the passive vehicle identification tag only if the fuel dispensing nozzle is properly placed inside the vehicle refueling port. Determining the required signal strength is based, in part on the identity of the vehicle.

In embodiments, by identity of the vehicle is meant a given class of vehicles to which the vehicle belongs that determines the required signal power. In embodiments of the present invention, by identity of the vehicle is meant the model of the vehicle as generally a passive identification tag will be positioned in all vehicles of the same model in substantially the same location and thus vehicle model will determine in large part the required signal power. In embodiments of the present invention, by identity of the vehicle is meant the actual identity of the vehicle and the authorization system includes a method, such as a look-up table, to determine the required signal power for each individual vehicle.

If the fuel dispensing nozzle is properly in place, then the distance between the identification tag reading transceiver and the identification tag is such that the power level determined is sufficient to allow the passive vehicle identification tag to transmit a response. The response is registered by the identification tag transceiver, relayed to the service station controller and refueling is authorized.

If the fuel dispensing nozzle is not properly in place, then the distance between the identification tag reading transceiver and the identification tag is such that the power level determined is too weak to allow the passive vehicle identification tag to transmit a response. The lack of response is registered by the identification tag transceiver, relayed to the service station controller and refueling is not authorized.

In embodiments, transmission at the determined power level and registration of a response as described above is performed throughout the refueling process to ensure that once refueling authorization is received, the fuel-dispensing nozzle is not removed from the refueling port while fuel is being pumped out through the fuel-dispensing nozzle.

Depending on the exact implementation and embodiment, the signal related to the required power is received by the identification tag reader from one or more of various sources.

In embodiments, a vehicle is provided with an active identification tag (as described in unpublished pending U.S. Patent Application No. 60/762,498 of the applicant) from which the identification tag reader receives the signal related to the required power.

In embodiments, the identification tag reader receives the signal related to the required power from a service station controller. In such embodiments the identification tag reader generally include a station communication transceiver for receipt of the signal from the service station controller.

In embodiments, the identification tag reader receives the signal related to the required power from the passive identification tag. In such embodiments for example, the vehicle identification tag reader transmits an exploratory signal having a sufficient power to read substantially any passive vehicle identification tag and in response the passive vehicle identification tag transmits the signal related to the required power power-determining signal.

In embodiments, the power-determining signal received comprises the required power level.

In embodiments, the power-determining signal received comprises the vehicle model or vehicle identity. In such embodiments, an identification tag reader generally includes a logic circuit (in embodiments a modification of or addition to control processor 32 or identification tag transceiver 28, but in embodiments, for example, a separate component) configured to determine a required power level based on the power-determining signal received, for example a vehicle model or a vehicle identity. The signal is received and the logic circuit calculates, for example using a look-up table, what is the required power level.

Figure 6A:
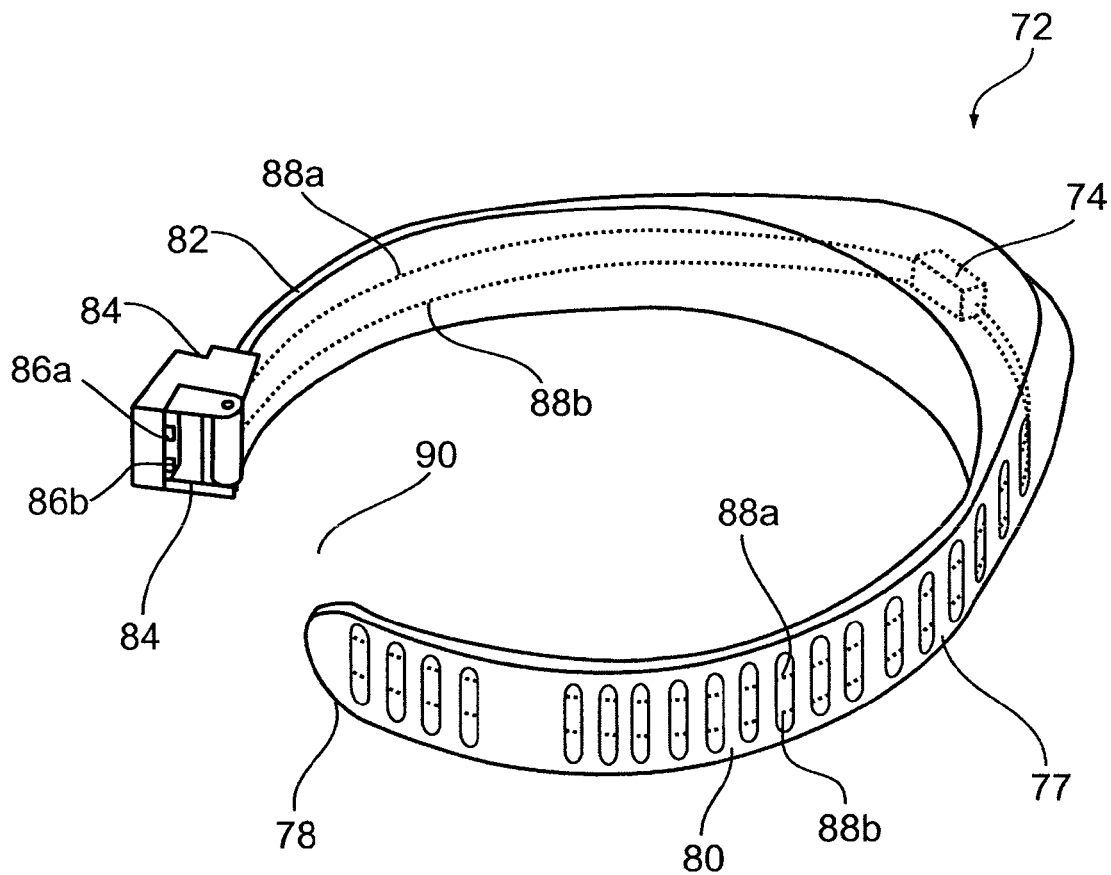
FIGS. 6A-6C are schematic depiction of a vehicle identification tag including a anti-tamper circuit in accordance with the sixth aspect of the present invention.
Figure 6B:
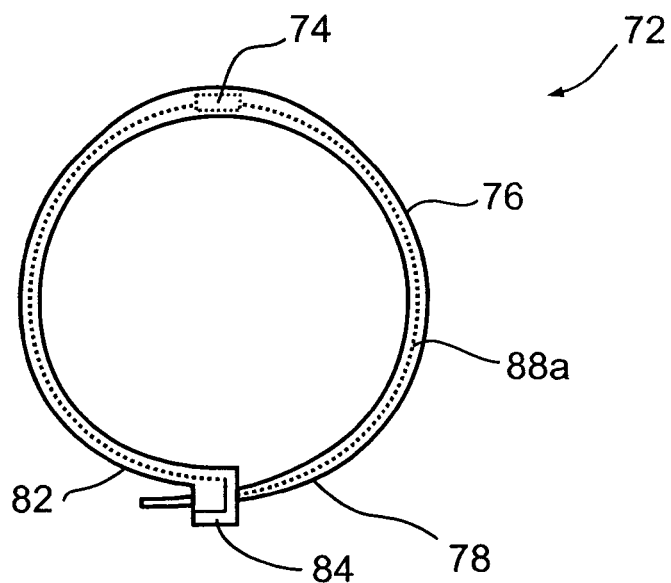
Figure 6C:
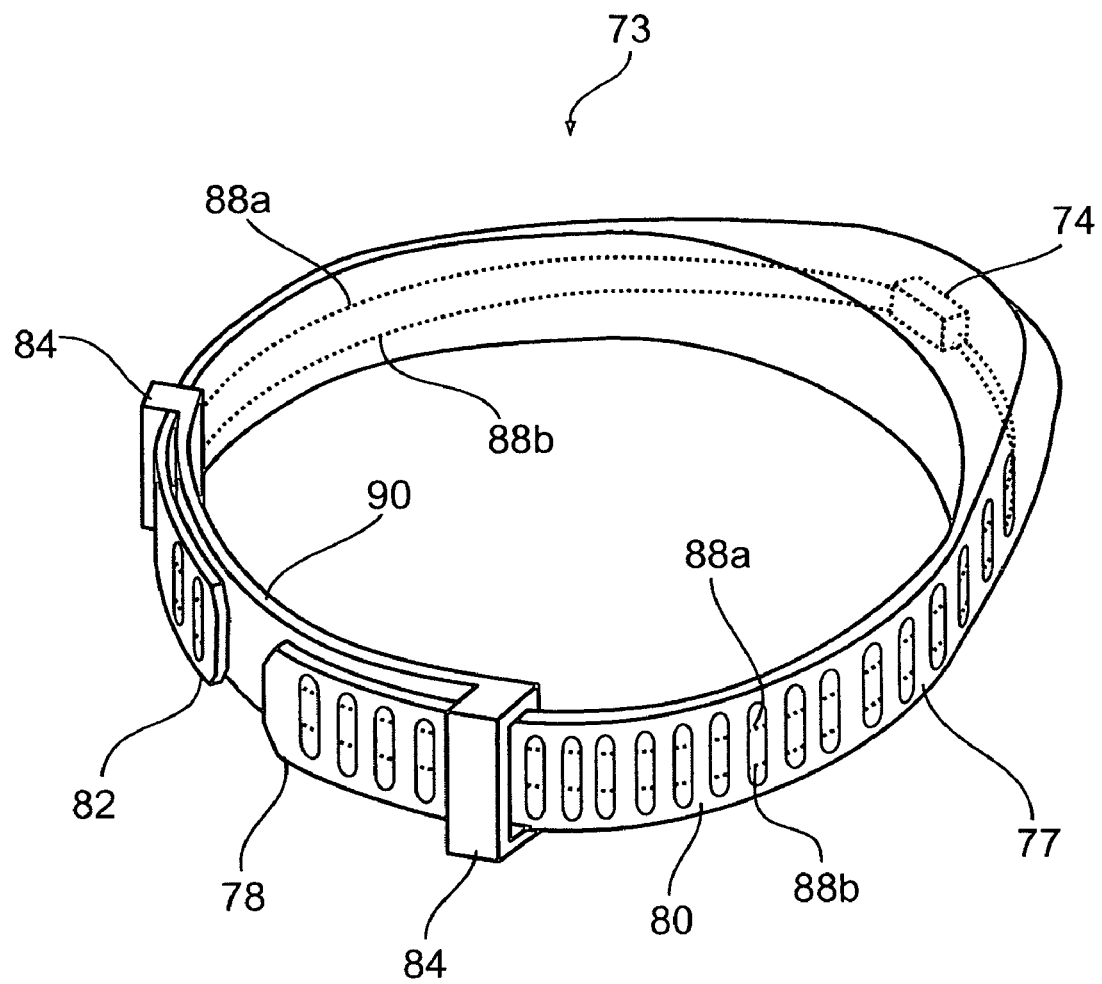

As noted above, a seventh aspect of the present invention is of a vehicle identification tag that is abuse resistant and simple to install on vehicles. Specifically, the tag is configured for attachment to a vehicle using a constricting band placed around a fuel inlet pipe of a vehicle, for example as often found in lorries and the like. Running through the band are conductors such as wires that are part of an identification circuit, for example parts of an antenna or components of an anti-tamper sub-circuit. When the band is cut, for instance to steal the vehicle identification tag, the conductors are also cut, disabling or otherwise rendering the circuit inoperable. An exemplary embodiment of the seventh aspect of the present invention, vehicle identification tag 72 is depicted in FIGS. 6A-6C.

Vehicle identification tag 72 includes a passive vehicle identification circuit 74 (a passive RFID circuit) embedded inside a constricting band 76.

Constricting band 76 is configured to be a non-releasable constricting band, analogous to a plastic tie known to one skilled in the art of packing. To this end a first end 78 of constricting band 76 is provided with teeth 80 as locking features and an opposing end 82 of constricting band 76 is provided with a locking head 84 configured to receive first end 78 and including pawls 86*a* and 86*b* to engage teeth 80 so as to prevent withdrawal of first end 78 from locking head 84 once first end 78 is threaded through locking head 84.

Embedded in constricting band 76 are two mutually insulated conductors 88*a* and 88*b*, each conductor constituting a part of an anti-tamper sub-circuit with which identification circuit 74 is associated.

As seen in FIG. 6A, both conductors 88*a* and 88*b* are split in two parts. At first end 78 of constricting band 76, conductors 88*a* and 88*b* are apparent on the outside of first end 78 between the gaps between teeth 80, constituting electrical contacts on first end 78. At opposing end 82 of constricting band 76 terminate with a conductive pawls 86*a* and 86*b*, constituting electrical contacts on opposing end 82.

When either of conductors 88*a* or 88*b* is open, identification circuit 74 is inoperable. When both conductors 88*a* and 88*b* are closed, identification circuit 74 is operable in the usual way.

When constricting band 76 is open in a linear configuration, conductors 88*a* and 88*b* are open, FIG. 6A. For use, constricting band 76 is looped by coupling first end 78 to opposing end 82 by threading the tip of first end 78 through locking head 84 so as to loop constricting band 76 into a looped configuration. Pawls 86*a* and 86*b* slide over teeth 80 and settle in the gaps between teeth 80, analogously to prior art plastic ties. When pawls 86*a* and 86*b* are located in gaps between teeth 80, pawls 86*a* and 86*b* contact the apparent parts of conductors 88*a* and 88*b* of first end 78 of constricting band 76 and thus close conductors 88*a* and 88*b*, completing the anti-tamper circuit and allowing vehicle identification tag 72 to function in the usual way. Pawls 86*a* and 86*b* therefore have two functions: constituting a locking mechanism to engage teeth 80 and keep constricting band 76 in a looped state and constituting contacts allowing conductors 88*a* and 88*b* to be closed when constricting band 76 is in a looped configuration.

Conductors 88*a* and 88*b* of vehicle identification tag 72 depicted in FIGS. 6A and 6B are substantially parallel. In embodiments, conductors are intertwined so that once cut it is more difficult to connect between the two halves of a cut conductor and thus reactivate the vehicle identification circuit. In embodiments, dummy conductors are embedded in a constricting band. Dummy conductors are generally of the same construction of conductors but do not constitute part of an anti-tamper circuit. Once cut it is more difficult to connect between the two halves of a cut conductor and thus reactivate the vehicle identification circuit due to the presence of dummy conductors and the confusion caused thereby. In embodiments, dummy conductors are intertwined with conductors.

In embodiments of the present invention a constricting band of a vehicle identification tag includes one or more band couplers. A band coupler is an extension piece that is optionally added to provide a constricting band with an increased diameter in the looped configuration. In FIG. 6C is depicted vehicle identification tag 73 where constricting band 77 is as described above but includes an additional band coupler 90, where a first end of band coupler 90 coupled first end 78 and a second end of band coupler 90 coupled to opposing end 82 of constricting band 77.

As is seen in FIG. 6C, band coupler 90 is provided with a locking head 84 at each end, each locking head provided with two conducting pawls (not seen in FIG. 6C, but analogous to conducting pawls 86 of vehicle identification tag 72 depicted in FIGS. 6A and 6B) where a conducting pawl at a first end of band coupler 90 is electrical connected with a conducting pawl at a second end through a conductor embedded in band coupler 90. Further as is seen in FIG. 6C, both first end 78 and opposing end 82 are provided with teeth 80 where in the gaps between teeth 80 are apparent two conductors 88a and 88b.

For use, constricting band 76 is looped by threading the tip of first end 78 through a first locking head 84 of band coupler 90 and threading the tip of opposing end 82 through a second locking head 84 of band coupler 90. Pawls in each locking head 84 slide over teeth 80 and settle in the gaps between teeth 80 as described above. When pawls are located in gaps between teeth 80, the pawls contact the apparent parts of conductors 88a and 88b of first end 78 and opposing end 82 of constricting band 76 and thus close conductors 88a and 88b, completing the anti-tamper circuit and allowing vehicle identification tag 72 to function in the usual way.

As noted above, an eighth aspect of the present invention is of a vehicle identification tag that is abuse-resistant and simple to install on vehicles. Specifically, the tag is configured for attachment to a vehicle with adhesive that provides an adhesion stronger than the structural strength of at least part of the vehicle identification tag (e.g., epoxies, cyanoacrylate adhesives, epoxy adhesives, acrylic adhesives, VHB™ by 3M™ corporation, St. Paul, Minn., USA). When an attempt is made to detach the vehicle identification tag by breaking the adhesion, the tag breaks, disabling or otherwise rendering the vehicle identification circuit inoperable. Exemplary embodiments of the eighth aspect of the present invention are depicted in FIGS. 7A-7G.

Figure 7A:
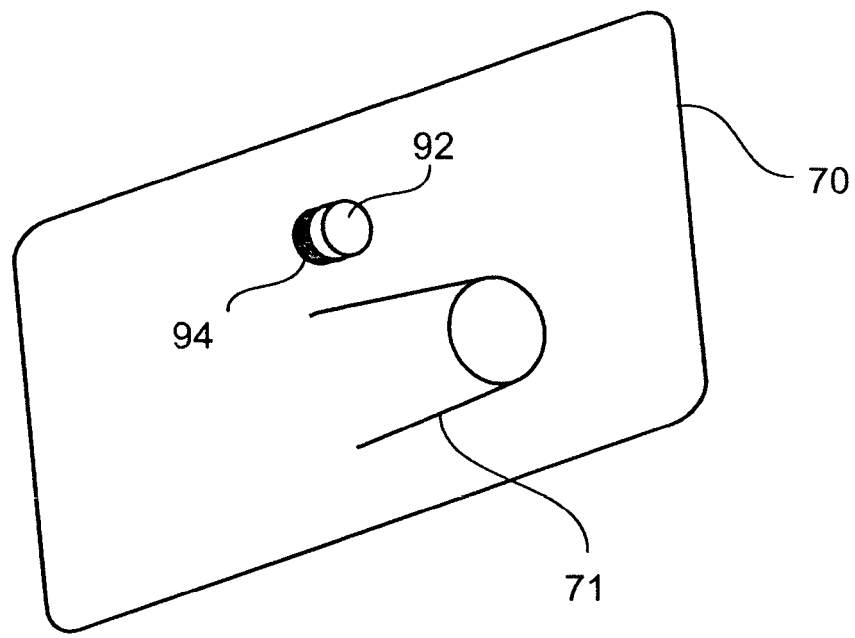
FIGS. 7A-7G are schematic depiction of vehicle identification tags in accordance with the seventh aspect of the present invention.

In FIG. 7A is depicted a first embodiment of the eighth aspect of the present invention. A vehicle identification tag 92 (substantially a prior art passive RFID circuit embedded in a thin plastic casing about the size of a dime, e.g., substantially as described in U.S. patent application Ser. No. 10/433,606 published as US 2004/0075616) is attached to a refueling port 70 of a vehicle in proximity of a fuel inlet pipe 71 with the use of an adhesive, (e.g., VHB™ by 3M™ corporation, St. Paul, Minn., USA), to form an adhesion 94. The material (e.g., foam rubber or plastic) from which the casing of vehicle identification tag 92 is fashioned is selected to have a structural strength lesser than the strength of adhesion 94. When a person attempts to remove vehicle identification tag 92, there is no choice but to use a chisel or the like which breaks and renders vehicle identification tag 92 unusable.

Figure 7B:
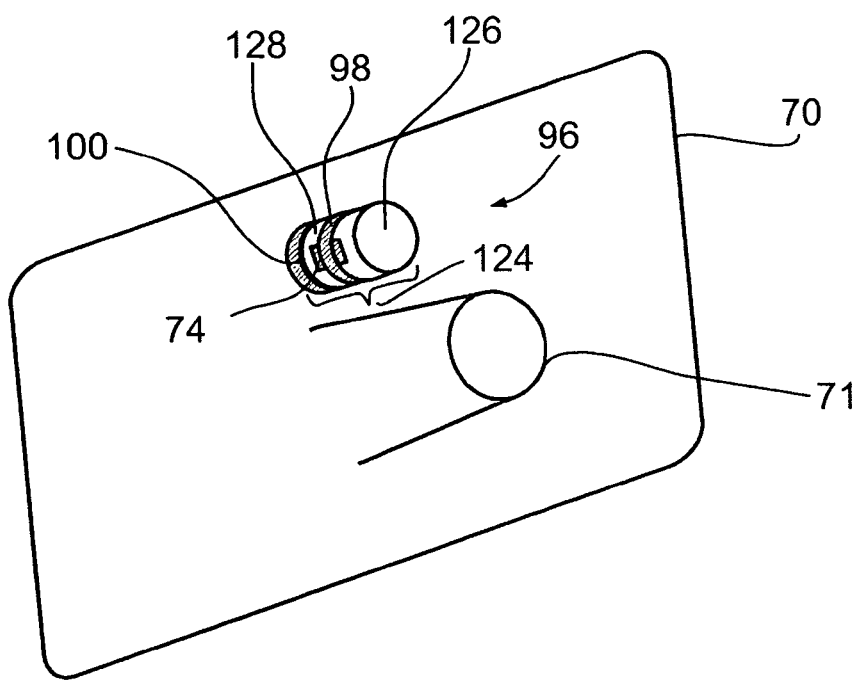

In FIG. 7B is depicted a second embodiment of the eighth aspect of the present invention. A vehicle identification tag 96 is provided having a vehicle identification circuit 74 embedded inside a casing 124. Casing 124 is made up of two parts, an upper casing part 126 and a lower casing part 128. In each casing part 126 and 128 is embedded a portion of vehicle identification circuit 74 so that when casing parts 126 and 128 are separate, vehicle identification circuit 74 substantially does not function. Casing parts 126 and 128 are mated and secured together using a second adhesive to form a second adhesion 98 and complete vehicle identification circuit 74. Second adhesive is selected so that second adhesion 98 constitutes a weak point of casing 124. Vehicle identification tag 96 is attached to a refueling port 70 of a vehicle in proximity of a fuel inlet pipe 71 with the use of a first adhesive to form a first adhesion 100. The first adhesive (e.g., VHB™ by 3M™ corporation, St. Paul, Minn., USA) is chosen so that first adhesion 100 has an adhesive strength that is significantly stronger than the adhesive strength of second adhesion 98 (e.g., Bison Kit® Universal, Bison International, Goes, The Netherlands). When a person attempts to remove vehicle identification tag 96 by prying or other physical means casing 124 breaks at second adhesion 98 rendering vehicle identification tag 96 unusable.

Figure 7C:
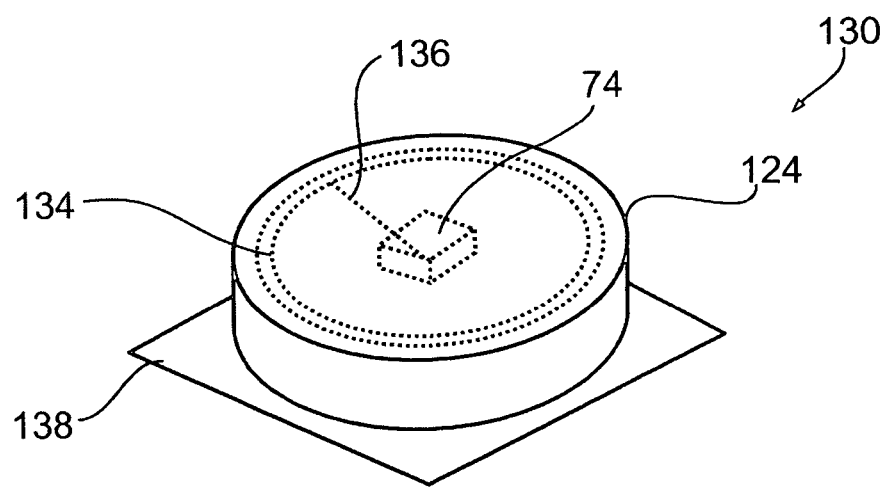
Figure 7D:
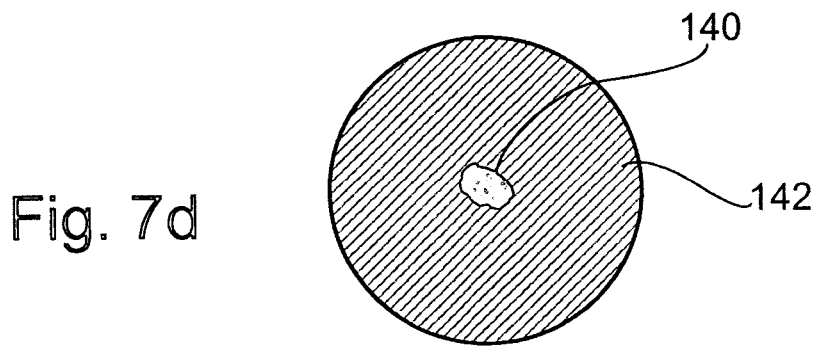
Figure 7E:
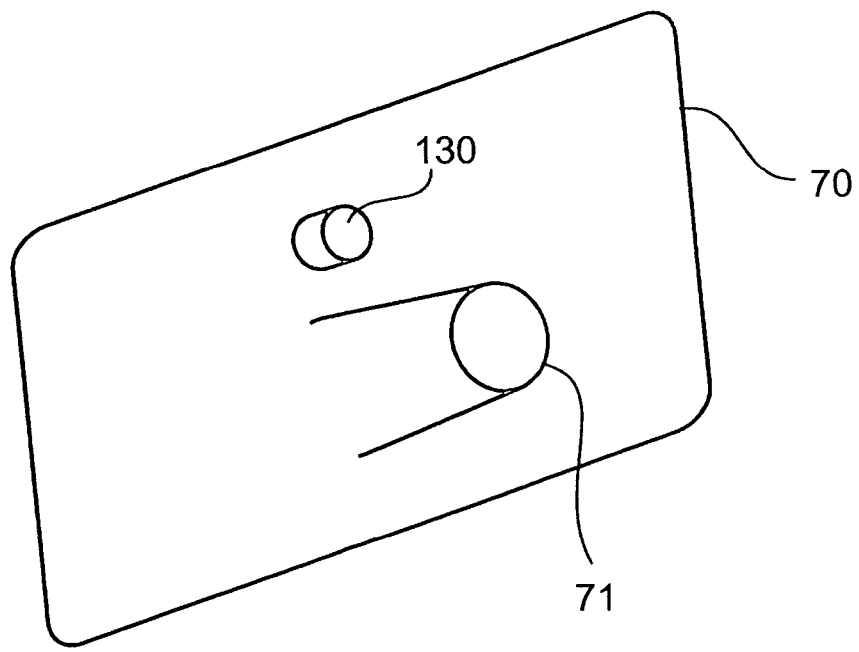

A third embodiment of the eighth aspect of the present invention, vehicle identification tag 130 is depicted in FIGS. 7C, 7D and 7E.

In FIG. 7C, tag 130 is depicted ready for attachment to a vehicle. Tag 130 comprises a casing 124 (about the size of a dime) in which passive vehicle identification circuit 74 (substantially a passive RFID circuit e.g., substantially as described in U.S. patent application Ser. No. 10/433,606 published as US 2004/0075616) is embedded close to the center of the bottom surface of casing 124. Circular antenna 134 is embedded close to the periphery of casing 124 and is functionally associated with vehicle identification circuit 74 through wires 136. Adhesive protective sheet 138 is removably attached to the bottom surface of casing 124 with adhesive, as discussed below.

In FIG. 7D, the bottom surface of casing 124 of tag 130 is depicted after the removal of adhesive protective sheet 138. It is seen that the bottom surface is divided into two substantially concentric regions: a centered inner region under passive vehicle identification circuit 74 where a first, strong, adhesive 140 (e.g., VHB™ by 3M™ corporation, St. Paul, Minn., USA) is applied and a circular band surrounding adhesive 140 where a second, weaker, adhesive 142 is applied.

In FIG. 7E, tag 130 is depicted attached to a refueling port 70 of a vehicle in proximity of a fuel inlet pipe 71 with two different adhesions. A first, strong adhesion resulting from the contact of first adhesive 140 with the painted metal surface of refueling port 70 that is stronger than the structural strength of casing 124 in proximity of passive vehicle identification circuit 74 and a second, weaker, adhesion resulting from the contact of second adhesive 142 with the painted metal surface of refueling port 70 that is sufficiently strong to keep tag 130 in place and flush with refueling port 70. Casing 124 is of a material, such as a rubber, that has a structural strength lesser than the strength of the adhesion of first adhesive 140 with the paint covered metal surface of refueling port 70. When a person attempts to remove vehicle identification tag 130 from refueling port 70, the second adhesion of adhesive 142 is released and pulled outwards from refueling port 70 while the first adhesion of first adhesive 140 remains in place. As a result, passive vehicle identification circuit 74 and fragments of casing 124 remains in place attached to the vehicle while the majority of casing 124 with antenna 134 embedded therein is pulled away tearing wires 136 and thus rendering tag 130 substantially unusable.

Figure 7F:
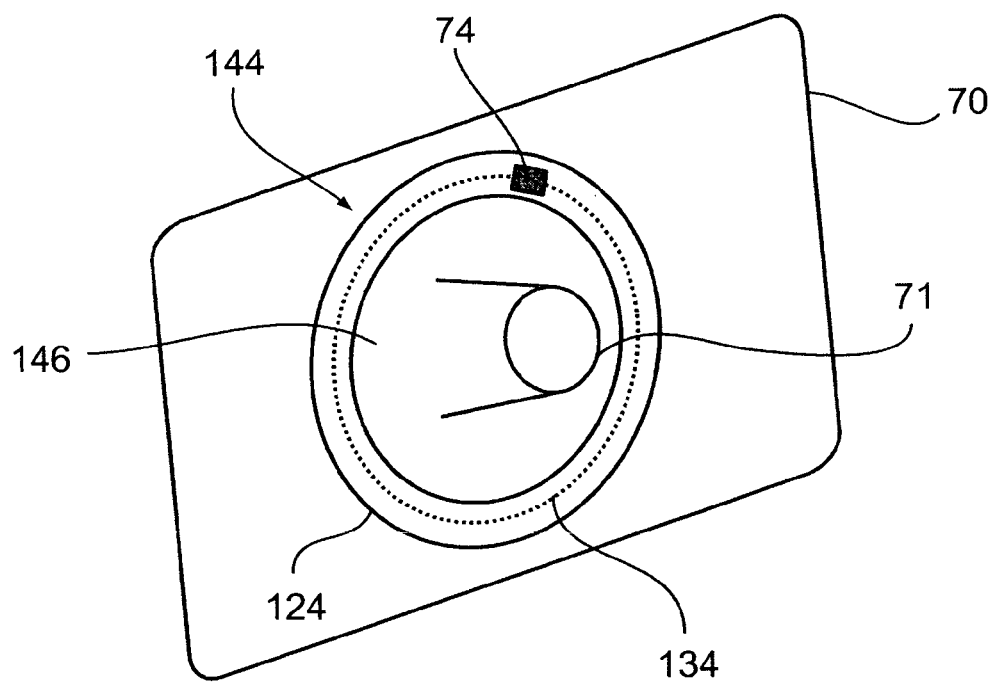

In FIG. 7F, is depicted a fourth embodiment of the eighth aspect of the present invention, vehicle identification tag 144. Vehicle identification tag 144 is similar to vehicle identification tag 130 depicted in FIGS. 7C, 7D and 7E. One difference is that casing 124 of tag 144 is substantially a loop with a hole 146 and that antenna 134 is embedded in casing 124 substantially concentric with hole 146. On the bottom surface of casing 124 of tag 144 underneath the location where passive vehicle identification circuit 74 is embedded is a first strong adhesive (e.g., VHB™ by 3M™ corporation, St. Paul, Minn., USA) that forms an adhesion with the paint covered metal surface of refueling port 70 that is stronger than the structural strength of the material from which casing 124 is made, analogously to first adhesive 140 of tag 130. In embodiments, the regions of the bottom surface of casing 124 where there is no first strong adhesive are provided with a second weaker adhesive (analogously to adhesive 142 of tag 130, e.g., Bison Kit® Universal, Bison International, Goes, The Netherlands) while in embodiments, the regions of the bottom surface of casing 124 where there is no first strong adhesive are devoid of an other adhesive.

For use, fuel inlet pipe 71 is threaded through hole 146 and tag 144 attached to a refueling port 70 with a strong adhesion resulting from the contact of the first strong adhesive in proximity of passive vehicle identification circuit 74. Casing 124 is of a material, such as a rubber, that has a structural strength lesser than the strength of the strong adhesion. When a person attempts to remove vehicle identification tag 144 from refueling port 70 passive vehicle identification circuit 74 and fragments of casing 124 remain in place attached to the vehicle while the majority of casing 124 with antenna 134 embedded therein is pulled away, rendering tag 144 substantially unusable.

Figure 7G:
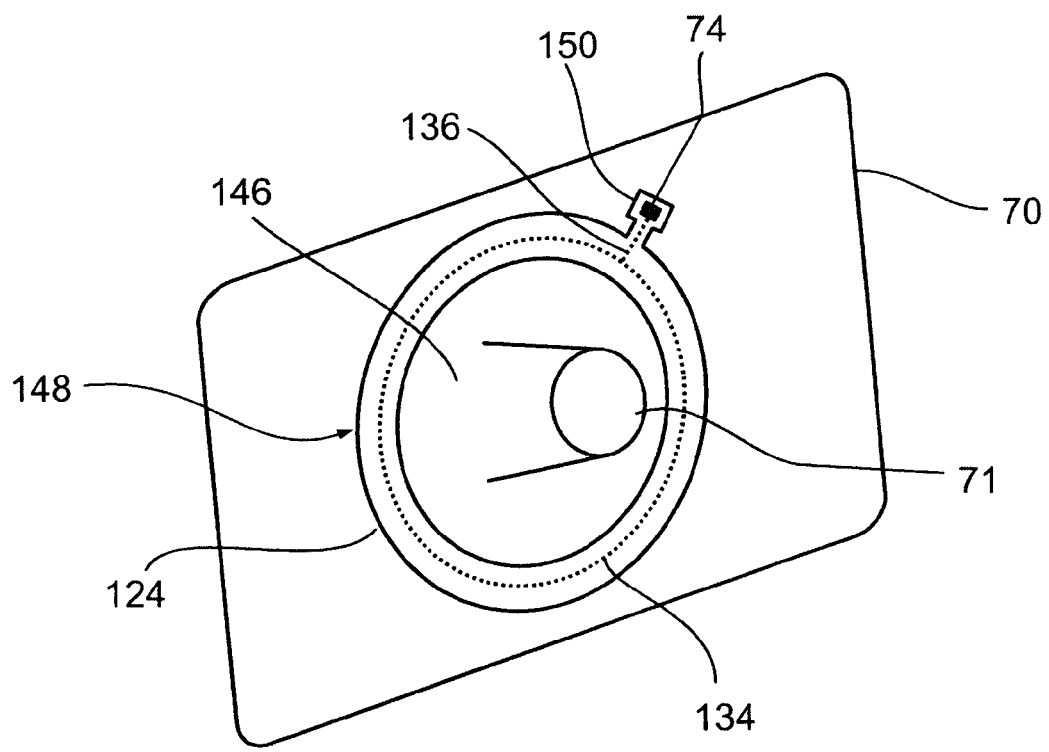

In FIG. 7G, is depicted a fifth embodiment of the eighth aspect of the present invention, vehicle identification tag 148. Vehicle identification tag 148 is similar to vehicle identification tag 144 depicted in FIG. 7F. Similarly to tag 144, casing 124 of tag 148 includes a loop-shaped part with a hole 146 and antenna 134 is embedded in the loop-shaped part substantially concentric with hole 146. However, in tag 148, a passive vehicle identification circuit 74 is embedded in a part 150 of casing 124 that dangles or protrudes from the loop-shaped part by a thin and weak part through which wires 136 functionally associating passive vehicle identification circuit 74 with antenna 134 are embedded. A first strong adhesive as described above is found on the bottom surface of dangling part 150 underneath the location where passive vehicle identification circuit 74 is embedded, the first strong adhesive selected to form an adhesion with the paint covered metal surface of refueling port 70 that is stronger than the structural strength of the material from which casing is made (e.g., VHB™ by 3M™ corporation, St. Paul, Minn., USA) and stronger than thin and weak portion of casing 124 in which wires 136 are embedded. In embodiments, the regions of the bottom surface of the loop-shaped part of casing 124 are provided with a second weaker adhesive (analogously to adhesive 142 of tag 130, e.g., Bison Kit® Universal, Bison International, Goes, The Netherlands) while in embodiments, the regions of the bottom surface of the loop-shaped part of casing 124 of vehicle identification tag 148 are devoid of an adhesive.

For use, fuel inlet pipe 71 is threaded through hole 146 and tag 148 attached to a refueling port 70 with a strong adhesion resulting from the contact of the strong first adhesive with dangling part 150 in proximity of passive vehicle identification circuit 74. When a person attempts to remove vehicle identification tag 148 from refueling port 70, passive vehicle identification circuit 74 and fragments of casing 124 remain in place attached to the vehicle while the majority of casing 124 with antenna 134 embedded therein is pulled away, rendering tag 148 substantially unusable.

One skilled in the art recognizes that an advantage of tags 144 and 148 lies in having a circular antenna 134 that when properly installed encircles a fuel inlet pipe 71, so that a tag reader attached to a fuel-dispensing nozzle is able to read a tag 144 or 148 whatever the orientation and angle at which the fuel-dispensing nozzle enters a fuel inlet pipe 71.

In non-depicted embodiments of the present invention, a vehicle identification tag is secured to a vehicle, especially in proximity of a fuel-inlet port with an adhesive that forms an adhesion that is stronger than the part of the vehicle to which secured. When an effort is made to remove the tag, the adhesive remains intact and rather the vehicle is damaged.

One skilled in the art recognizes, upon perusal of the description above, that unlike prior art vehicle identification tags, a tag of the present invention as described above is installed with ease, even by a person with no special training or skill and without requiring any special tools or drilling of holes in a vehicle.

Figure 8:
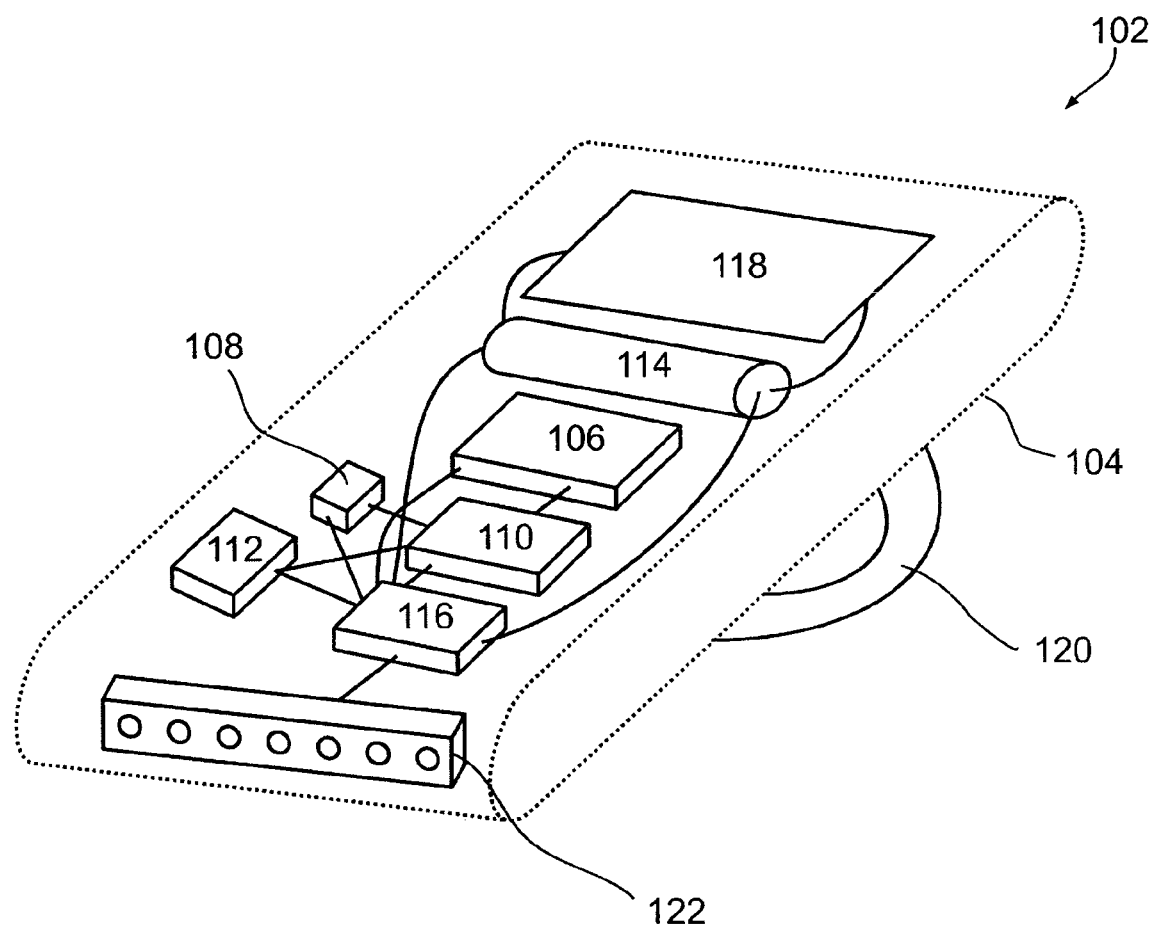
FIG. 8 is a schematic depiction of a meter device in accordance with the eighth aspect of the present invention.

In unpublished pending U.S. Patent Application No. 60/762,498 of the applicant is disclosed a system for authorizing purchases associated with vehicles including both a passive and an active identification tag associated with a vehicle to make fuel theft by theft of a passive identification tag difficult. Also disclosed is that the active identification tag acts as a meter device, recording data associated with vehicle use including driving behavior. A ninth aspect of the present invention is of a meter device recording vehicle use and is configured to act as an active identification tag characterized in being entirely self-contained, so as to be simple to install and tamper proof. An exemplary embodiment of the ninth aspect of the present invention, meter device 102 is depicted in FIG. 8.

Meter device 102 is configured to record and store data relating to vehicular operation and to transmit the data, for example to a central location such as a service station controller as described in unpublished pending U.S. Patent Application No. 60/762,498 of the applicant.

Meter device 102 includes a casing 104 (depicted in phantom in FIG. 8) in which is found a measuring component 106, a timer 108, a unique device identifier stored in a memory 110, a wireless transceiver 112, integral power storage unit 114, a meter device controller 116, photovoltaic cell 118, suction cup 120 and a vehicle-use detector 122.

Measuring component 106 is configured to periodically measure data relating to the location of meter device 102. Measuring component 106 preferably functions independently of a vehicle in which found. Suitable technologies to implement a measuring component 106 include technologies based on reception of radio signals for example, from satellites (e.g., GPS satellites), transmitters from a dedicated network, and/or cellular telephony transmitters. Measuring component 106 is in communication with memory 110 for recording data related to the location data.

Timer 108 is configured to mark time for use by other components of meter device 102. Timer 108 is in communication with memory 110 (in embodiments is provided with a dedicated memory) for recording data related to output of timer 108.

Wireless transceiver 112 is configured to have at least two modes: a passive mode wherein wireless transceiver only receives transmissions from a service station controller and an active mode wherein transceiver 112 transmits recorded data to a service station controller. In embodiments, transceiver 112 enters the active mode upon receipt of such a command from a service station controller.

Meter device controller 116 is configured to control other components of meter device 102 and to act as a data processing component. From location data measured by measuring component 106 and associated time data from timer 108, meter device controller is configured to process the location data to produce the related data, such as for example to calculate a distance (such as distance traveled), to calculate a velocity, to calculate acceleration or to calculate a turning rate.

Meter device controller 116 is configured, after a predetermined time period when meter device 102 does not move, to enter an energy-saving sleep mode to save energy. In the sleep mode, meter device controller 116 monitors output from vehicle-use detector 122 and records output from timer 108. If vehicle-use detector 122 indicates that the associated vehicle is being used or is anticipated to be used, meter device 102 exits the sleep mode. In meter device 102, vehicle-use detector 122 is an infrared vehicle occupant detector as known in the art. Other suitable vehicle-use detectors include vehicle-motion detectors and engine-activity detectors, for example sensors that detect the distinct sound of a running vehicle engine.

Integral power storage unit 114 is configured to provide electrical power to other components of meter device 102. Integral power storage unit 114 is rechargeable and is functionally associated with photovoltaic cell 118, which is configured to recharge integral power storage unit 114. In embodiments, a meter device of the present invention is provided with a kinetic electricity generator, to convert mechanical energy from movement of meter device 102 into electrical energy to recharge the integral power storage unit, substantially as described above for the fourth aspect of the present invention. It is important to note that it is preferred that a power-generating component of a meter device of the present invention be independent of user intervention to lessen operator mistakes or intentional misuse.

Suction cup 120 is configured to fix meter device 102 to a vehicle windshield for clear access to sunlight necessary for photovoltaic cell 118 to recharge integral power storage unit 114 and to provide line if sight for measuring component 106 with GPS satellites. In embodiments, a meter device is configured to be fixed in a vehicle with the use of other methods, for example a magnet or adhesive. In embodiments a meter device of the present invention is configured to be fixed to a dashboard or a vehicle mirror.

For use, meter device 102 is attached to a windshield using suction cup 120. After a time of inactivity, meter device controller 116 enters sleep mode to save power. When vehicle use detector 122 detects that the vehicle is being used, meter device controller 116 exits sleep mode and activates measuring component 106. Periodically data relating to the location of the vehicle is recorded and these data used, together with timer 108 output to calculate information such as vehicle location, vehicle velocity, vehicle acceleration and vehicle turn rate. The information is recorded. When meter device 102 enters the proximity of a service station controller, the service station controller instructs meter device controller 116 to transmit all recorded data to service station controller using wireless transceiver 112.

Meter device controller 116 of meter device 102 described above is configured to calculate and store various values such as velocity, acceleration, turn rate and distance traveled from data from measuring component 106 and timer 108. In embodiments, raw data is stored and transferred, as described above, to a service station controller and the various values are calculated at a different location.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Methods and processes have been described herein as a series of steps in an order selected as being the easiest to understand. It must be emphasized that such order is not limiting, and any method or process may be performed in any reasonable order to achieve the desired result.

Although the invention has been described in conjunction with specific embodiments thereof, it is evident that many alternatives, modifications and variations will be apparent to those skilled in the art. Accordingly, the present invention is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A vehicle identification tag, comprising
   a) a constricting band having a looped configuration and comprising an electrically conducting fastener;
   b) a vehicle identification circuit attached to said constricting band; and
   c) at least one electrical conductor embedded in said band as a component of an anti-tamper circuit of said vehicle identification circuit
   wherein when said constricting band is in said looped configuration said at least one electrical conductor is closed through said electrically conducting fastener for closing a part of said anti-tamper circuit, and when said band is in a non-looped configuration said part of said anti-tamper circuit is broken whereby said vehicle identification circuit is rendered substantially inoperable.

2. The identification tag of claim 1, wherein said at least one electrical conductor embedded in said band are at least two mutually insulated electrical conductors, each as a component of said anti-tamper circuit.

3. The identification tag of claim 1, wherein said constricting band is a non-releasable constricting band.

4. The identification tag of claim 1, wherein said constricting band has at least two configurations:
   i) a linear configuration where said constriction band has a first end and an opposing end, where said at least one electrical conductor is open; and
   ii) said looped configuration, where said at least one electrical conductor is closed
   wherein said band is configured to be looped into said looped configuration from said linear configuration.

5. The identification tag of claim 4, wherein in a region in proximity of said first end and said opposing end are provided electrical contacts apparent on a surface of said constricting band, each electrical contact in contact with an electrical conductor from amongst said at least one electrical conductors so that when a said electrical contact in proximity of said first end is contacted with a said electrical contact in proximity of said opposing end, a said electrical conductor is closed.

6. The identification tag of claim 4, wherein said looping into said looped configuration includes coupling said first end to said opposing end.

7. The identification tag of claim 6, wherein said first end is provided with locking features and said opposing end is provided with a locking head configured to receive said first end and to engage said locking features so as to prevent withdrawal of said first end from said locking head whereby said first end is coupled to said opposing end and said band is looped.

8. The identification tag of claim 1 wherein said electrically conducting fastener includes at least one pawl.

9. The identification tag of claim 8 wherein said constricting band includes teeth for engaging said at least one pawl.

10. The identification tag of claim 9 wherein said at least one pawl electrically contacts said at least one electrical conductor inside a gap between said teeth.

11. A vehicle identification tag reader, comprising:
 a) a casing configured for attachment to a fuel-dispensing nozzle;
 b) an identification tag reading transceiver sealed within said casing;
 c) a power storage unit for supplying energy to said transceiver; and
 d) a movement detector for detecting movement of the fuel-dispensing nozzle for activating said transceiver.

12. The tag reader of claim 11, wherein said casing is monolithic.

13. The tag reader of claim 11, wherein said transceiver is enclosed within a sealed chamber inside said casing.

14. The tag reader of claim 13, wherein said chamber is seamless.

15. The identification tag reader of claim 11 wherein said movement detector includes a mercury switch.

16. A vehicle identification tag reader, comprising:
 a) a casing configured for attachment to a fuel-dispensing nozzle;
 b) an identification tag reading transceiver associated with said casing;
 c) a rechargeable power storage unit for supplying energy to said transceiver; and
 d) a generator to convert mechanical energy from actuation of a trigger of said fuel-dispensing nozzle into electrical energy to recharge said power storage unit.

17. A vehicle identification tag reader, comprising:
 a) a casing configured for attachment to a fuel-dispensing nozzle;
 b) an identification tag reading transceiver associated with said casing;
 c) a rechargeable power storage unit for supplying energy to said transceiver; and
 d) a generator to convert mechanical energy from movement of the tag-reader into electrical energy to recharge said power storage unit.

18. A method of producing a theft-resistant vehicle identification tag comprising:
 a) attaching a vehicle identification circuit to a constricting band having a looped configuration and an electrically conducting fastener; and
 b) embedding at least one electrical conductor in said constricting band as a component of an anti-tamper circuit of said vehicle identification circuit such, that when said constricting band is in said looped configuration said at least one electrical conductor is closed through said electrically conducting fastener for closing a part of said anti-tamper circuit, and when said band is in a non-looped configuration said part of said anti-tamper circuit is broken whereby said vehicle identification circuit is rendered substantially inoperable.

* * * * *